(12) United States Patent
Xu et al.

(10) Patent No.: US 10,411,838 B2
(45) Date of Patent: Sep. 10, 2019

(54) COVERAGE ENHANCEMENTS WITH CARRIER AGGREGATION

(71) Applicant: QUALCOMM Incorporated, San Diego, CA (US)

(72) Inventors: Hao Xu, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/601,465

(22) Filed: Jan. 21, 2015

(65) Prior Publication Data

US 2015/0208415 A1 Jul. 23, 2015

Related U.S. Application Data

(60) Provisional application No. 61/930,938, filed on Jan. 23, 2014.

(51) Int. Cl.
*H04L 1/18* (2006.01)
*H04L 5/00* (2006.01)
(Continued)

(52) U.S. Cl.
CPC .............. *H04L 1/1822* (2013.01); *H04L 1/08* (2013.01); *H04L 5/001* (2013.01); *H04L 5/0055* (2013.01);
(Continued)

(58) Field of Classification Search
None
See application file for complete search history.

(56) References Cited

U.S. PATENT DOCUMENTS

2009/0191885 A1 7/2009 Nosley
2010/0296467 A1* 11/2010 Pelletier .............. H04W 74/002
370/329
(Continued)

FOREIGN PATENT DOCUMENTS

EP 2690815 A2 1/2014
EP 2840732 A1 2/2015
(Continued)

OTHER PUBLICATIONS

Panasonic, "Soft buffer partitioning for TDD interband CA", 3GPP TSG-RAN WG1 Meeting #71, New Orleans, USA, Nov. 12-16, 2012, R1-124779.*
(Continued)

*Primary Examiner* — Joseph A Bednash
(74) *Attorney, Agent, or Firm* — Holland & Hart LLP

(57) ABSTRACT

Methods, systems, and devices are described for effective deployment of coverage enhancements in applications involving carrier aggregation or reception-limited devices, or both. Different categories of user equipment (UE) may be configured to receive simultaneous broadcasts and unicasts differently according physical limitations of each category of UE. Several component carriers may be utilized, and each may employ the same or different coverage enhancement techniques. Differences in coverage enhancement techniques may be accounted for with numbers and timing of hybrid automatic repeat request (HARM) processes, soft buffer partitioning, channel bundling, and/or transmission prioritization. UEs may determine to cease transmission of one or more component carriers based on different priorities assigned to the component carriers.

22 Claims, 22 Drawing Sheets

(51) Int. Cl.
H04L 1/08 (2006.01)
H04W 72/04 (2009.01)
H04L 1/00 (2006.01)

(52) U.S. Cl.
CPC ......... *H04W 72/042* (2013.01); *H04L 1/1812* (2013.01); *H04L 2001/0093* (2013.01)

(56) References Cited

U.S. PATENT DOCUMENTS

| | | | |
|---|---|---|---|
| 2012/0099491 | A1 | 4/2012 | Lee et al. |
| 2012/0263130 | A1 | 10/2012 | Ishikura et al. |
| 2013/0070652 | A1 | 3/2013 | Li et al. |
| 2013/0223235 | A1* | 8/2013 | Hu .................. H04W 36/04 370/242 |
| 2016/0227580 | A1* | 8/2016 | Xiong ............... H04W 36/0055 |

FOREIGN PATENT DOCUMENTS

| | | |
|---|---|---|
| JP | 2009543380 A | 12/2009 |
| JP | 2012019314 A | 1/2012 |
| JP | 2013531443 A | 8/2013 |
| JP | 2013534749 A | 9/2013 |
| WO | WO-2008004681 A1 | 1/2008 |
| WO | WO-2011065407 A1 | 6/2011 |
| WO | WO-2011156967 A1 | 12/2011 |
| WO | WO-2012008957 A1 | 1/2012 |
| WO | WO-2012128558 A2 | 9/2012 |
| WO | WO 2012/136269 A1 * 10/2012 ............... H04L 5/00 |
| WO | WO-2013166711 A1 | 11/2013 |

OTHER PUBLICATIONS

Samsung, "Discussion on PUCCH HARQ-ACK transmission", 3GPP TSG-RAN WG1 #69, Prague, Czech Republic, May 21-25, 2012, R1-122220.*

Ericsson, ST-Ericsson, ""Soft buffer operations in aggregation of TDD carriers with different UL/DL configurations, 3GPP TSG-RAN WG1 #70b, San Diego, USA, Oct. 8-12, 2012, R1-124147*.*
Ericsson, HARQ Operation in case of UL Power Limitation, 3GPP TSG-RAN WG2 #58bis, Orlando, USA, Jun. 25-29, 2007, R2-072630.*
Ericsson, "Maximum Number of HARQ Processes in Aggregation of TDD Carriers with Different UL/DL Configuration," R1-124480, 3GPP TSG-RAN WG1 #70b, San Diego, USA, Oct. 8-12, 2012, 6 pgs., 3rd Generation Partnership Project.
Huawei, "Soft Buffer Partitioning for TDD Inter-band CA with Different UL-DL Configurations," R1-124686, 3GPP TSG RAN WG1 Meeting #71, New Orleans, USA, Nov. 12-16, 2012, 3 pgs., 3rd Generation Partnership Project.
ISA/EPO, International Search Report and Written Opinion of the International Searching Authority, Int'l. App. No. PCT/US2015/012480, Sep. 28, 2015, European Patent Office, Rijswijk, NL, 20 pgs.
Panasonic, "Soft Buffer Partitioning for TDD Inter-band CA," R1-124779, 3GPP TSG-RAN WG1 Meeting #71, New Orleans, USA, Nov. 12-16, 2012, 5 pgs., 3rd Generation Partnership Project.
ISA/EPO, Partial International Search Report of the International Searching Authority, Int'l. App. No. PCT/US2015/012480, Jun. 24, 2015, European Patent Office, Rijswijk, NL, 5 pgs.
LG Electronics, "Discussion and Draft Answer on LS R1-061109," 3GPP TSG RAN WG1#45, Shanghai, China, R1-061154, May 8-12, 2006, pp. 1-5, XP_50102042A, 3rd Generation Partnership Project.
Nokia et al., "UE Capability for Dedicated Carrier MBMS and Unicast Reception," 3GPP TSG-RAN WG2 Meeting #56, Riga, Latvia, R2-063066, Nov. 6-10, 2006, 7 pgs., XP_50132578A, 3rd Generation Partnership Project.
Nokia Siemens Networks et al., "Open Issues in RRC_Connected State During MBMS Reception," 3GPP TSG-RAN WG2 Meeting #60, Jeju, South Korea, R2-075196, Nov. 5-9, 2007, 3 pgs., XP_50137638A, 3rd Generation Partnership Project.
Panasonic, "TBS Size and Simultaneous Reception Capability on Low Category UE with Enhanced Coverage Mode," 3GPP TSG-RAN WG1 Meeting 75, San Francisco, USA, R1-135392, Nov. 11-15, 2013, 5 pgs., XP_50750634A, 3rd Generation Partnership Project.

* cited by examiner

COVERAGE ENHANCEMENTS WITH CARRIER AGGREGATION

CROSS REFERENCES

The present Application for Patent claims priority to U.S. Provisional Patent Application No. 61/930,938 by Xu et al., entitled "Coverage Enhancements with Carrier Aggregation and Low Cost Considerations," filed Jan. 23, 2014, assigned to the assignee thereof, and expressly incorporated by reference herein.

BACKGROUND

The following relates generally to wireless communication, and more specifically to selecting coverage enhancement techniques. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Coverage enhancement techniques may be used to improve coverage in wireless systems, and these techniques may become more relevant as reception-limited devices (e.g., MTC and other low cost devices) begin to proliferate. These coverage techniques may present implementation challenges in systems using carrier aggregation, particularly wherein the need for coverage enhancement varies by carrier.

SUMMARY

The described features generally relate to one or more improved systems, methods, and devices for the use of coverage enhancement techniques in systems involving carrier aggregation or reception-limited devices, or both. Devices may transmit and receive control and data communications on one or several component carriers in ways that allow coverage enhancement techniques to be effectively employed. Different categories of user equipment (UE) may be configured to receive simultaneous broadcasts and unicasts differently according physical limitations of each category of UE. Multiple component carriers may employ different coverage enhancement techniques, which may be accounted for with numbers and timing of hybrid automatic repeat request (HARM) processes, soft buffer partitioning, channel bundling, and/or transmission prioritization.

In some embodiments, a method of wireless communication at a user equipment (UE) with limited simultaneous reception capability includes identifying a reception time for a broadcast channel to be received at the UE and refraining from decoding a unicast channel received at the UE at the reception time based at least in part on the identification. The method may further include receiving, at the UE, a broadcast channel having at least one of a system information block (SIB) or a physical broadcast channel (PBCH). The broadcast channel may be a bundled broadcast channel.

In some embodiments, a method of wireless communication from a base station, includes determining a category of a user equipment (UE) identified as a recipient of data that is to be transmitted from the base station and refraining from transmitting unicast data to the UE during a broadcast time based at least in part on the determined category of UE. The method may further include transmitting, from the base station, a broadcast channel having at least one of a system information block (SIB) or a physical broadcast channel (PBCH). The broadcast channel may be a bundled broadcast channel.

In some embodiments, an apparatus for wireless communication from a user equipment (UE) with limited simultaneous reception capability includes a processor, memory in electronic communication with the processor, and instructions stored in the memory. The instructions may be executable by the processor to identify a reception time for a broadcast channel to be received at the UE and refrain from decoding a unicast channel received at the UE at the reception time based at least in part on the identification. The instructions may also be executable by the processor to receive, at the UE, a broadcast channel having at least one of a system information block (SIB) or a physical broadcast channel (PBCH). The broadcast channel may be a bundled broadcast channel.

In some embodiments, an apparatus for wireless communication from a base station includes a processor, memory in electronic communication with the processor, and instructions stored in the memory. The instructions may be executable by the processor to determine a category of a user equipment (UE) identified as a recipient of data that is to be transmitted from the base station and refrain from transmitting unicast data to the UE during a broadcast time based at least in part on the determined category of UE. The instructions may also be executable by the processor to transmit, from the base station, a broadcast channel having at least one of a system information block (SIB) or a physical broadcast channel (PBCH). The broadcast channel may be a bundled broadcast channel.

In some embodiments, an apparatus for wireless communication from a user equipment (UE) with limited simultaneous reception capacity includes means for identifying a reception time for a broadcast channel to be received at the UE and means for refraining from decoding a unicast channel received at the UE at the reception time based at least in part on the identification. The apparatus may include means for receiving, at the UE, a broadcast channel having at least one of a system information block (SIB) or a physical broadcast channel (PBCH).

In some embodiments, an apparatus for wireless communication from a base station, includes means for determining a category of a user equipment (UE) identified as a recipient of data that is to be transmitted from the base station and means for refraining from transmitting unicast data to the UE during a broadcast time based at least in part on the determined category of UE. The apparatus may also include means for transmitting, from the base station, a broadcast channel having at least one of a system information block (SIB) or a physical broadcast channel (PBCH).

In some embodiments, a computer program product for wireless communication from a user equipment (UE) with limited simultaneous reception capability includes a non-transitory computer readable medium. The computer readable medium may store instructions executable by a processor to identify a reception time for a broadcast channel to be received at the UE and refrain from decoding a unicast channel received at the UE at the reception time based at least in part on the identification. The instructions may also be executable by the processor to receive, at the UE, a broadcast channel having at least one of a system information block (SIB) or a physical broadcast channel (PBCH).

In some embodiments, a computer program product for wireless communication from a base station includes a non-transitory computer readable medium. The computer readable medium may store instructions executable by a processor to determine a category of a user equipment (UE) identified as a recipient of data that is to be transmitted from the base station and refrain from transmitting unicast data to the UE during a broadcast time based at least in part on the determined category of UE. The instructions may also be executable by the processor to transmit, from the base station, a broadcast channel having at least one of a system information block (SIB) or a physical broadcast channel (PBCH).

In some embodiments, a method of wireless communication includes receiving a first component carrier transmitted according to a first coverage enhancement technique and receiving a second component carrier transmitted according to a second coverage enhancement technique, where the second coverage enhancement technique may be different from the first coverage enhancement technique.

In some embodiments, an apparatus for wireless communication includes a processor, memory in electronic communication with the processor, and instructions stored in the memory. The instructions may be executable by the processor to receive a first component carrier transmitted according to a first coverage enhancement technique and receive a second component carrier transmitted according to a second coverage enhancement technique, where the second coverage enhancement technique may be different from the first coverage enhancement technique.

In some embodiments, an apparatus for wireless communication includes means for receiving a first component carrier transmitted according to a first coverage enhancement technique and means for receiving a second component carrier transmitted according to a second coverage enhancement technique, where the second coverage enhancement technique may be different from the first coverage enhancement technique.

In some embodiments, a computer program product for wireless communication includes a non-transitory computer readable medium. The computer readable medium may store instructions executable by a processor to receive a first component carrier transmitted according to a first coverage enhancement technique and receive a second component carrier transmitted according to a second coverage enhancement technique, where the second coverage enhancement technique may be different from the different from the first coverage enhancement technique.

In certain examples of the methods, apparatuses, and/or computer program products, the first coverage enhancement technique and the second coverage enhancement technique each include bundling, and the difference between the first coverage enhancement technique and the second coverage enhancement technique may be a difference in bundling size.

In certain examples of the methods, apparatuses, and/or computer program products, the first component carrier and the second component carrier may each be individually configured for coverage enhancements.

In certain examples of the methods, apparatuses, and/or computer program products, the second component carrier may be cross-carrier scheduled from the first component carrier, and the second coverage enhancement technique includes bundling.

In certain examples, the methods, apparatuses, and/or computer program products may include steps of, means for, and/or processor-executable instructions for measuring path loss of the first component carrier and the second component carrier, and selecting, for initial access, the first component carrier or the second component carrier based on the measured path loss.

In certain examples, the methods, apparatuses, and/or computer program products may include steps of, means for, and/or processor-executable instructions for measuring path loss of the first component carrier and the second component carrier and transmitting feedback based on the measured path loss, the feedback comprising a suggested primary cell (PCell).

In certain examples, the methods, apparatuses, and/or computer program products may include steps of, means for, and/or processor-executable instructions for partitioning a soft buffer equally for the component carriers, where a number of hybrid automatic repeat request (HARQ) processes or a bundling length may be different for each component carrier.

In certain examples, the methods, apparatuses, and/or computer program products may include steps of, means for, and/or processor-executable instructions for partitioning a soft buffer based on a number of hybrid automatic repeat request (HARQ) processes or a bundling length for each of the component carriers, where the number of HARQ processes or the bundling length may be different for each component carrier.

In certain examples of the methods, apparatuses, and/or computer program products, the first component carrier and the second component carrier may belong to a subset of a plurality of component carriers received at the UE, wherein each component carrier of the subset needs coverage enhancement and is restricted to a same number of hybrid automatic repeat request (HARQ) processes.

In certain examples, the methods, apparatuses, and/or computer program products may include steps of, means for, and/or processor-executable instructions for receiving a third component carrier transmitted without coverage enhancement, wherein the third component carrier is configured with an unrestricted number of hybrid automatic repeat request (HARQ) processes and the first component carrier and the second component carrier may both be configured with a restricted number of (HARQ) processes based on a type of coverage enhancement technique used.

In certain examples of the methods, apparatuses, and/or computer program products, the first coverage enhancement technique and the second coverage enhancement technique each include bundling and all control channels may be allocated to the component carrier having the least bundling. Additionally or alternatively, data channels may be allocated to both component carriers.

In certain examples, the methods, apparatuses, and/or computer program products may include steps of, means for, and/or processor-executable instructions for identifying a downlink (DL) hybrid automatic repeat request (HARQ) timing based on whether the first component carrier comprises a bundled or an unbundled control channel.

In certain examples of the methods, apparatuses, and/or computer program products, at least one of the first coverage enhancement technique or the second coverage enhancement technique includes channel repetition and a length of the channel repetition is interpreted by a user equipment (UE) based on a category of the UE. Additionally or alternatively, at least one of the first component carrier or the second component carrier may include a broadcast channel.

In still further embodiments, a method of wireless communication includes transmitting a first component carrier according to a first coverage enhancement technique and transmitting a second component carrier according to a second coverage enhancement technique, where the second coverage enhancement technique may be different from the first coverage enhancement technique.

In some embodiments, an apparatus for wireless communication, includes a processor, memory in electronic communication with the processor, and instructions stored in the memory. The instructions may be executable by the processor to transmit a first component carrier according to a first coverage enhancement technique and transmit a second component carrier according to a second coverage enhancement technique, where the second coverage enhancement technique may be different from the first coverage enhancement technique.

In some embodiments, an apparatus for wireless communication includes means for transmitting a first component carrier according to a first coverage enhancement technique and means for transmitting a second component carrier according to a second coverage enhancement technique, where the second coverage enhancement technique may be different from the first coverage enhancement technique.

In some embodiments, a computer program product for wireless communication includes a non-transitory computer readable medium. The computer readable medium may store instructions executable by a processor to transmit a first component carrier according to a first coverage enhancement technique and transmit a second component carrier according to a second coverage enhancement technique, where the second coverage enhancement technique may be different from the first coverage enhancement technique.

In certain examples of the methods, apparatuses, and/or computer program products, the first coverage enhancement technique and the second coverage enhancement technique may each include bundling, and the difference between the first coverage enhancement technique and the second coverage enhancement technique may include a difference in bundling size. The first component carrier and the second component carrier may each be individually configured for coverage enhancements. Additionally or alternatively, the second component carrier may be cross-carrier scheduled from the first component carrier, and the second coverage enhancement technique may include bundling.

In certain examples, the methods, apparatuses, and/or computer program products may include steps of, means for, and/or processor-executable instructions for receiving feedback comprising a suggested primary cell (PCell) and configuring the first component carrier or the second component carrier as the PCell based at least in part on the received feedback.

In certain examples, the methods, apparatuses, and/or computer program products may include steps of, means for, and/or processor-executable instructions for restricting the first component carrier and the second component carrier to a same number of hybrid automatic repeat request (HARQ) processes, where the restricting is based on transmission according to the coverage enhancement techniques, and for transmitting a third component carrier without coverage enhancement, configured with an unrestricted number of HARQ processes.

In certain examples, the methods, apparatuses, and/or computer program products may include steps of, means for, and/or processor-executable instructions for allocating all control channels to the component carrier having the least bundling, where the first coverage enhancement technique and the second coverage enhancement technique each include bundling.

In certain examples, the methods, apparatuses, and/or computer program products may include steps of, means for, and/or processor-executable instructions for allocating data channels to both component carriers.

In certain examples, the methods, apparatuses, and/or computer program products may include steps of, means for, and/or processor-executable instructions for determining an uplink (UL) hybrid automatic repeat request (HARQ) timing based on whether the first component carrier includes a bundled or an unbundled control channel.

In certain examples, the methods, apparatuses, and/or computer program products may include steps of, means for, and/or processor-executable instructions for determining an uplink (UL) hybrid automatic repeat request (HARQ) timing based on whether the first component carrier includes a bundled or an unbundled control channel.

In certain examples of the methods, apparatuses, and/or computer program products, at least one of the first coverage enhancement technique or the second coverage enhancement technique includes channel repetition and a length of the channel repetition may be interpreted by a user equipment (UE) based on a category of the UE. In some examples, at least one of the first component carrier or the second component carrier may include a broadcast channel.

In certain examples, the methods, apparatuses, and/or computer program products may include steps of, means for, and/or processor-executable instructions for determining to cease transmission of the first component carrier or the second component carrier when at least one of a power limitation or a dimension limitation is below a threshold, where the determining may be based on an initial transmission of the first component carrier or the second component carrier.

In certain examples, the methods, apparatuses, and/or computer program products may include steps of, means for, and/or processor-executable instructions for determining to cease transmission of the first component carrier or the second component carrier when at least one of a power limitation or a dimension limitation is below a threshold, where the determining may be based on coverage enhancement needs of each of the component carriers. Ceasing transmission may include ceasing transmission of the component carrier having a least coverage enhancement need. Or, ceasing transmission may include ceasing transmission of the component carrier having a greatest coverage enhancement need.

In certain examples, the methods, apparatuses, and/or computer program products may include steps of, means for, and/or processor-executable instructions for determining to cease transmission of the first component carrier or the second component carrier when at least one of a power limitation or a dimension limitation is below a threshold, where the determining may include determining which of the first component carrier and the second component carrier is a primary cell (PCell) and a secondary cell (SCell), and ceasing transmission of the SCell.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If the first reference label is used in the specification, the description is applicable to any one of the similar components having the same first reference label irrespective of the second reference label.

DETAILED DESCRIPTION

Figure 1:
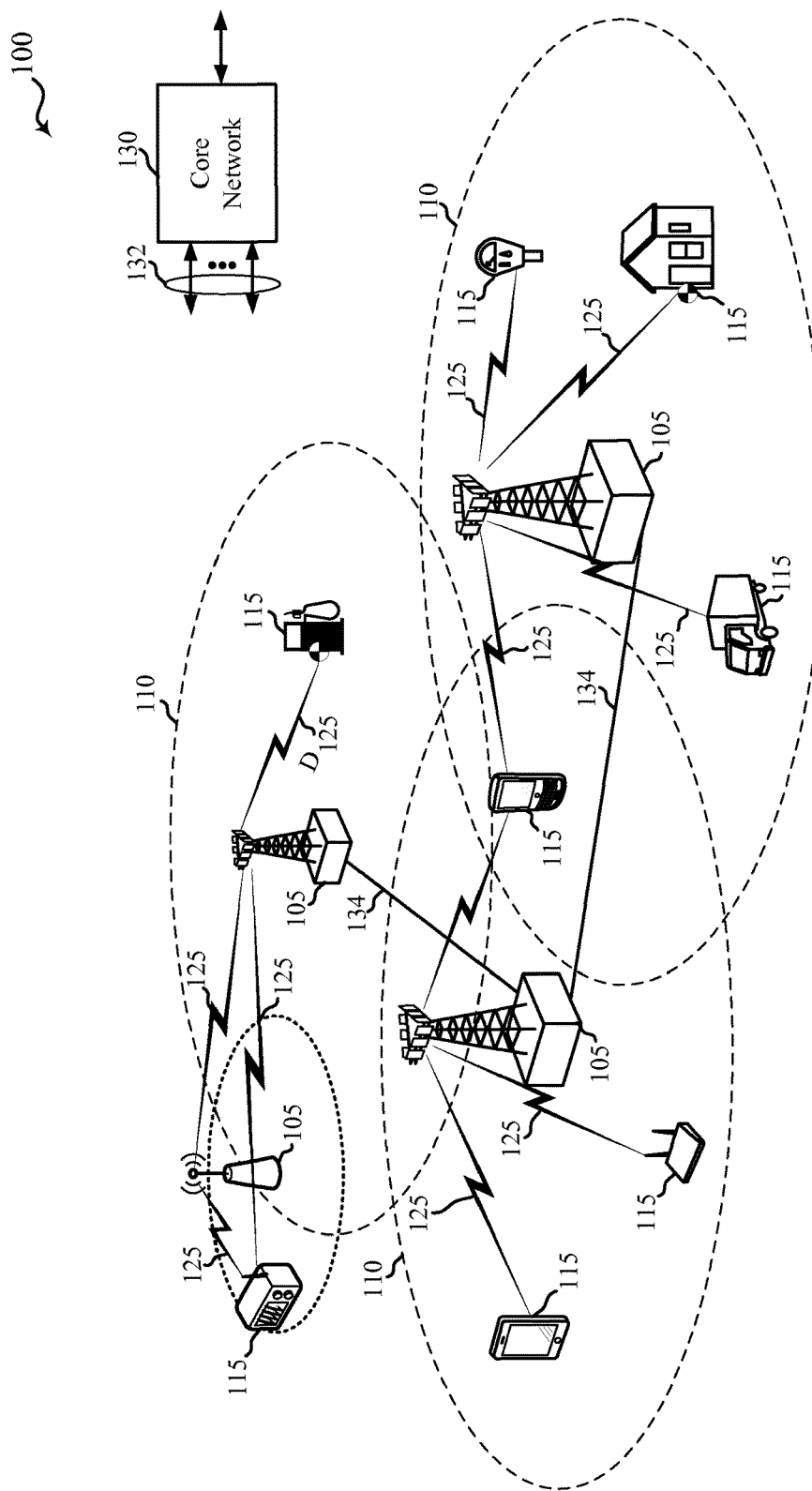
FIG. 1 is a block diagram illustrating an example of a wireless communications system configured for effective deployment of coverage enhancement techniques, in accordance with various embodiments.

Coverage enhancement implementation techniques are described for systems involving carrier aggregation or reception-limited devices, or both. Coverage enhancement techniques generally include ways to increase effectiveness of communications with devices operating under certain constraints. These constraints may include remote or distant locations, power limitations, reception capability, and the like. Coverage enhancement techniques may include repetition of transmissions within subframes, repetition across different subframes, power boosting, beamforming, spatial multiplexing, or the like. Coverage enhancement techniques may be applied in, for example, voice over internet protocol (VoIP) and medium rate deployments. Coverage enhancement techniques may also be employed for machine-type communication (MTC) applications.

MTC and/or machine-to-machine (M2M) communication may refer to data communication technologies that allow devices to communicate with one another or a base station without human intervention. For example, MTC may refer to communications from devices that integrate sensors or meters to measure or capture information and relay that information to a central server or application program that can make use of the information or present the information to humans interacting with the program or application. In many cases, MTC devices are power constrained. MTC devices may be used to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

A number of other applications may also benefit from coverage enhancement techniques. Systems utilizing extremely high frequencies (e.g., millimeter wave frequencies), unlicensed spectrum (e.g., 5.8 GHz), carrier aggregation, coordinated multi-point transmission/reception, and/or reception-limited UEs are just a few examples where coverage enhancement techniques may be beneficial. In these and other applications, certain management issues may arise. In order to effectively employ coverage enhancement techniques, system operation may need to account for certain issues such as, for example: effectively handling both broadcast and unicast channels at reception-limited UEs (e.g., UEs incapable of simultaneous reception); managing carrier aggregation when coverage enhancement is applied to one or more component carriers; managing soft buffering for HARQ process of bundled channels; and prioritizing control information and transmissions for, or on, component carriers operating with coverage enhancement techniques.

Systems and devices, as described herein, may be configured to support UEs having different simultaneous broadcast and unicast capabilities—including different categories of UEs. Additionally or alternatively, each component carrier in a carrier aggregation application may be individually configured for coverage enhancements (e.g., bundling). Likewise, various devices may be configured to implement buffer management and/or bundling management techniques that complement coverage enhancement techniques. Different categories of devices may employ coverage enhancement techniques according to the specific requirements and/or limitations of each device. Furthermore, aspects of a system may be configured to prioritize various transmissions according to whether and how coverage enhancement techniques are applied.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100 configured for effective deployment of coverage enhancement techniques, in accordance with various embodiments. The system 100 includes base stations (or cells) 105, communication devices 115, and a core network 130. The base stations 105 may communicate with the communication devices 115 under the control of a base station controller (not shown), which may be part of the core network 130 or the base stations 105 in various embodiments. Base stations 105 may communicate control information or user data with the core network 130 through backhaul links 132. Backhaul links 132 may be wired backhaul links (e.g., copper, fiber, etc.) and/or wireless backhaul links (e.g., microwave, etc.). In some embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective coverage area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up a portion of the coverage area (not shown). The system 100 may include base stations 105 of different types (e.g., macro, micro, and/or pico base stations). There may be overlapping coverage areas for different technologies.

The communication devices 115 are dispersed throughout the wireless network 100, and each device may be stationary or mobile. A communication device 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a user equipment, a mobile client, a client, or some other suitable terminology. A communication device 115 may be an MTC device, a cellular phone, a personal digital assistant (PDA), a wireless modem, a wireless communication device, a handheld device, a tablet computer, a laptop computer, a cordless phone, a wireless local loop (WLL) station, or the like. In some implementations, an MTC device may be included in or operate in conjunction with a meter (e.g., a gas meter) or other monitoring device. A communication device may be able to communicate with macro base stations, pico base stations, femto base stations, relay base stations, and the like.

The transmission links 125 shown in network 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions.

Base stations 105 may, for example, utilize carrier aggregation to increase downlink throughput to communication devices 115. Carrier aggregation may be used on the uplink, as well. The component carriers (CCs) can be in the same frequency operating band (intra-band) or in different operating bands (inter-band) and intra-band CCs can be contiguous or non-contiguous within the operating band. Different coverage enhancement techniques may be applied on different component carriers. Using different coverage enhancement techniques may give rise to certain issues, which may be addressed by controlling the number and timing of HARQ processes, soft buffer partitioning, channel bundling, and/or transmission prioritization. In other examples, different categories of user equipment (UE) may be configured to receive simultaneous broadcasts and unicasts differently according to physical limitations of each category of UE. These aspects, described below in more detail, may be integrated in whole or in part into a wide variety of network configurations.

In some embodiments, the system 100 is an LTE/LTE-A network, and a general description of aspects of such a network follows. In LTE/LTE-A networks, the terms evolved Node B (eNB) and user equipment (UE) may be generally used to describe the base stations 105 and communication devices 115, respectively. In the present disclosure, communication devices 115 and UEs 115 may be used interchangeably. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The communications system 100 according to an LTE/LTE-A network architecture may be referred to as an Evolved Packet System (EPS) 100. The EPS 100 may include one or more UEs 115, an Evolved UMTS Terrestrial Radio Access Network (E-UTRAN), an Evolved Packet Core (EPC) 130 (e.g., core network 130), a Home Subscriber Server (HSS), and an Operator's IP Services. The EPS may interconnect with other access networks using other Radio Access Technologies. For example, EPS 100 may interconnect with a UTRAN-based network and/or a CDMA-based network via one or more Serving GPRS Support Nodes (SGSNs). To support mobility of UEs 115 and/or load balancing, EPS 100 may support handover of UEs 115 between a source eNB 105 and a target eNB 105. EPS 100 may support intra-RAT handover between eNBs 105 and/or base stations of the same RAT (e.g., other E-UTRAN networks), and inter-RAT handovers between eNBs and/or base stations of different RATs (e.g., E-UTRAN to CDMA, etc.). The EPS 100 may provide packet-switched services, however, as those skilled in the art will readily appreciate, the various concepts presented throughout this disclosure may be extended to networks providing circuit-switched services.

The E-UTRAN may include the eNBs 105 and may provide user plane and control plane protocol terminations toward the UEs 115. The eNBs 105 may be connected to other eNBs 105 via backhaul link 134 (e.g., an X2 interface, and the like). The eNBs 105 may provide an access point to the EPC 130 for the UEs 115. The eNBs 105 may be connected by backhaul link 132 (e.g., an S1 interface, and the like) to the EPC 130. Logical nodes within EPC 130 may include one or more Mobility Management Entities (MMEs), one or more Serving Gateways, and one or more Packet Data Network (PDN) Gateways (not shown). Generally, the MME may provide bearer and connection management.

The UEs 115 may be configured to collaboratively communicate with multiple eNBs 105 through, for example, Multiple Input Multiple Output (MIMO), Coordinated Multi-Point (CoMP), or other schemes. MIMO techniques use multiple antennas on the base stations and/or multiple antennas on the UE to take advantage of multipath environments to transmit multiple data streams. CoMP includes techniques for dynamic coordination of transmission and reception by a number of eNBs to improve overall transmission quality for UEs as well as increasing network and spectrum utilization. Generally, CoMP techniques utilize backhaul links 132 and/or 134 for communication between base stations 105 to coordinate control plane and user plane communications for the UEs 115. The UEs 115 may be of various categories. For example, some of the UEs 115 may be reception-limited UEs 115, which may affect the multipath capabilities of those UEs 115.

The communication networks that may accommodate some of the various disclosed embodiments may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARM) techniques to provide retransmission at the MAC layer to ensure reliable data transmission. In the control plane, the Radio Resource Control (RRC) protocol layer may provide establishment, configuration, and maintenance of an RRC connection between the UE and the network used for the user plane data. At the Physical layer, the transport channels may be mapped to Physical channels.

The downlink physical channels may include at least one of a physical downlink control channel (PDCCH) and/or enhanced PDCCH (EPDCCH), a physical HARQ indicator channel (PHICH), and a physical downlink shared channel (PDSCH). The uplink physical channels may include at least one of a physical uplink control channel (PUCCH) and a physical uplink shared channel (PUSCH). The PDCCH may carry downlink control information (DCI), which may indicate data transmissions for UEs 115 on the PDSCH as well as provide UL resource grants to UEs 115 for the PUSCH. The UE may transmit control information in the PUCCH on the assigned resource blocks in the control section. The UE 115 may transmit data without control information or both data and control information in the PUSCH on the assigned resource blocks in the data section. Some UEs 115 may be configured for, and capable of simultaneous reception of both broadcast and unicast channels. Other UEs 115 may, however not be capable of simultaneous reception of broadcast and unicast channels. A reception-limited UE 115 (e.g., a low-cost MTC) may be configured to receive a wideband control channel (e.g., PDCCH), but may not support wideband operation for the data channel (e.g., PDSCH of 1.08 MHz) and may be configured to receive a narrowband data channel. In such cases, a reception-limited UE 115 may be capable of restricted DL assignments (e.g., 6 resource blocks).

LTE/LTE-A utilizes orthogonal frequency division multiple-access (OFDMA) on the downlink and single-carrier frequency division multiple-access (SC-FDMA) on the uplink. An OFDMA and/or SC-FDMA carrier may be partitioned into multiple (K) orthogonal subcarriers, which are also commonly referred to as tones, bins, or the like. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guard-band) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8, or 16 sub-bands.

The carriers may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined. Time intervals may be expressed in multiples of a basic time unit $T_s=1/30720000$. Each frame structure may have a radio frame length $T_f=307200 \cdot T_s=10$ ms and may include two half-frames or slots of length $153600 \cdot T_s=5$ ms each. Each half-frame may include five subframes of length $30720 \cdot T_s=1$ ms.

LTE/LTE-A networks support multi-process HARQ with a configurable number of independent HARQ processes. Each HARQ process may wait to receive an acknowledgement (ACK) before transmitting a new data or transport block. LTE/LTE-A uses asynchronous HARQ transmission on the downlink and synchronous HARQ transmission on the uplink. In both asynchronous and synchronous HARQ, ACK/NACK information may be provided a certain number of subframes after a DL or UL transmission, which may be referred to as HARQ timing. Generally, for LTE/LTE-A FDD carriers, ACK/NACK information for a HARQ process is transmitted 4 subframes after a data transmission. In asynchronous HARQ, a DL or UL scheduled for subsequent transmissions is not predetermined and the eNB provides instructions to the UE regarding which HARQ process are transmitted in each subframe. For synchronous HARQ in FDD, UEs 115 perform a second transmission of a particular HARQ process a predetermined number of subframes after receiving a NACK. Generally, for LTE/LTE-A FDD carriers subsequent UL transmissions of the same HARQ process occur 4 subframes after receiving a NACK. For synchronous HARQ in TDD, ACK/NACK information may be received in a subframe i associated with UL transmissions in a subframe i-k, where k may be defined according to TDD DL/UL configuration. Various HARQ techniques and options are described below in more detail.

Figure 2:
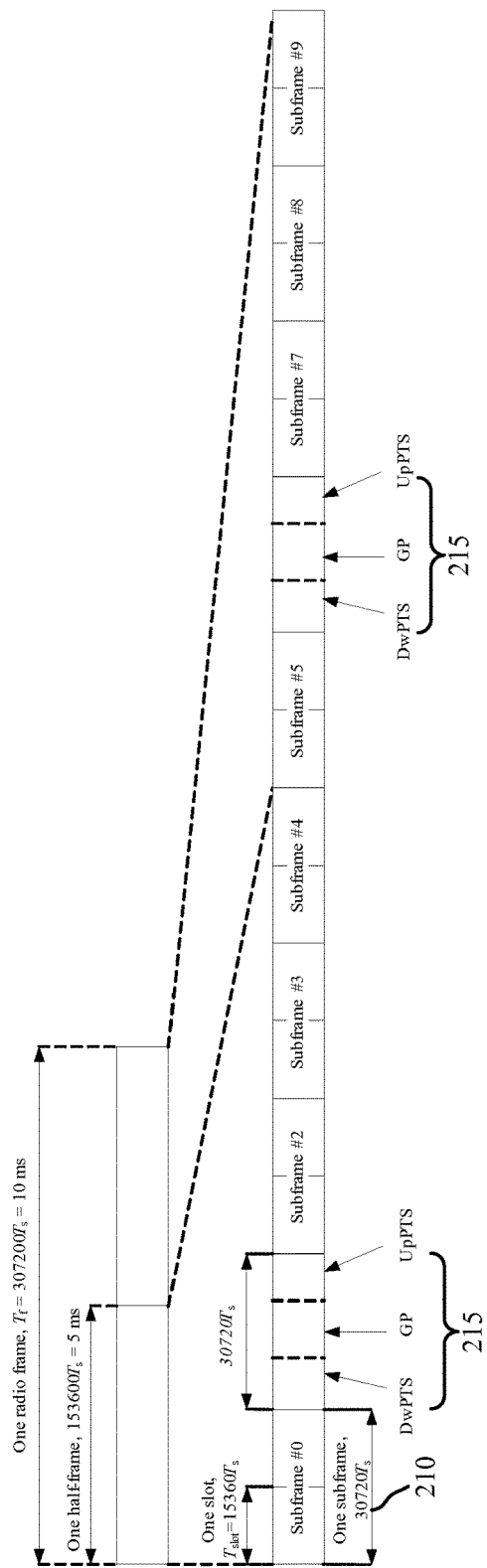
FIG. 2 is a block diagram illustrating a frame structure for a TDD carrier, which may be employed in accordance with various embodiments.

FIG. 2 illustrates a frame structure 200 for a TDD carrier, which may be employed in the system 100 in accordance with various embodiments. For TDD frame structures, each subframe 210 may carry UL or DL traffic, and special subframes ("S") 215 may be used to switch between DL to UL transmission. Allocation of UL and DL subframes within radio frames may be symmetric or asymmetric and may be reconfigured semi-statically or dynamically. Special subframes 215 may carry some DL and/or UL traffic and may include a Guard Period (GP) between DL and UL traffic. Switching from UL to DL traffic may be achieved by setting timing advance at the UEs without the use of Special subframes or a guard period between UL and DL subframes. TDD configurations with switch-point periodicity equal to the frame period (e.g., 10 ms) or half of the frame period (e.g., 5 ms) may be supported. For example, TDD frames may include one or more Special frames, and the period between Special frames may determine the TDD DL-to-UL switch-point periodicity for the frame.

For LTE/LTE-A, seven different TDD DL/UL configurations are defined that provide between 40% and 90% DL subframes as illustrated in Table 1.

TABLE 1

| TDD Configuration | Period (ms) | Subframe | | | | | | | | | |
|---|---|---|---|---|---|---|---|---|---|---|---|
| | | 0 | 1 | 2 | 3 | 4 | 5 | 6 | 7 | 8 | 9 |
| 0 | 5 | D | S | U | U | U | D | S | U | U | U |
| 1 | 5 | D | S | U | U | D | D | S | U | U | D |
| 2 | 5 | D | S | U | D | D | D | S | U | D | D |
| 3 | 10 | D | S | U | U | U | D | D | D | D | D |
| 4 | 10 | D | S | U | U | D | D | D | D | D | D |
| 5 | 10 | D | S | U | D | D | D | D | D | D | D |
| 6 | 5 | D | S | U | U | U | D | S | U | U | D |

Because some TDD DL/UL configurations have fewer UL subframes than DL subframes, several techniques may be used to transmit ACK/NACK information for an association set within a PUCCH transmission in the uplink subframe. For example, bundling may be used to combine ACK/NACK information to reduce the amount of ACK/NACK information to be sent. ACK/NACK bundling may combine the ACK/NACK information into a single bit that is set to an acknowledgement (ACK) value if the ACK/NACK information for each subframe of the association set is an ACK. For example, ACK/NACK information may be a binary '1' to represent ACK and a binary '0' to represent a negative acknowledgement (NACK) for a particular subframe. ACK/NACK information may be bundled using a logical AND operation on the ACK/NACK bits of the association set. Bundling reduces the amount of information to be sent over the PUCCH and therefore increases the efficiency of HARQ ACK/NACK feedback. Multiplexing may be used to transmit multiple bits of ACK/NACK information in one uplink subframe. For example, up to four bits of ACK/NACK may be transmitted using PUCCH format 1b with channel selection. In some embodiments, HARQ timing is independent of whether ACK/NACK is bundled or not.

Figure 3:
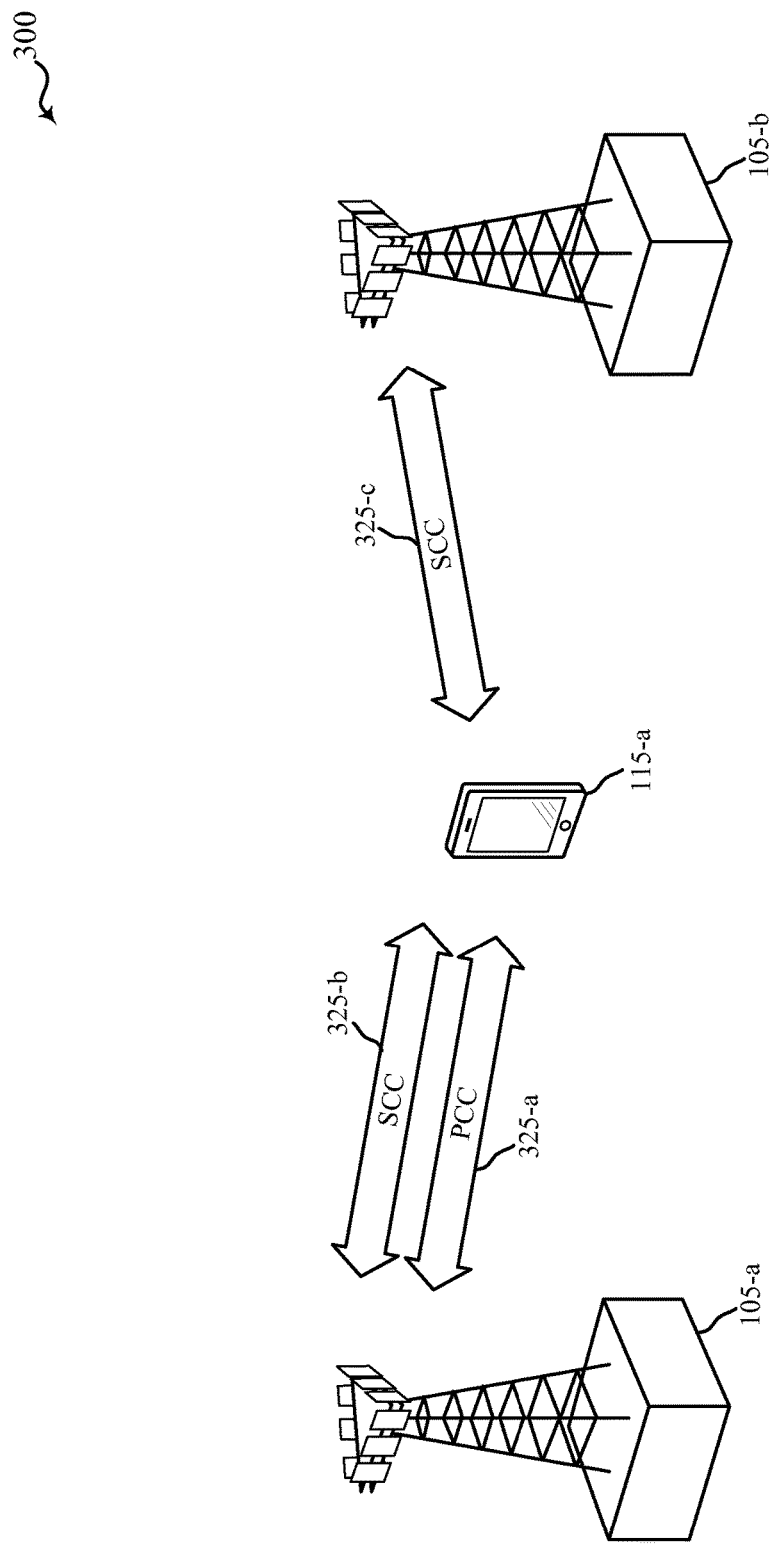
FIG. 3 is a block diagram of a system configured for effective deployment of coverage enhancement techniques, in accordance with various embodiments.

As noted above, wireless network 100 may support operation on multiple carriers, which may be referred to as carrier aggregation (CA) or multi-carrier operation. FIG. 3 shows a system 300 illustrating an example of a CA deployment. A carrier may also be referred to as a component carrier (CC), a layer, etc. The terms "carrier," "layer," and "CC" may thus be used interchangeably herein. In some examples, different CCs may use different coverage enhancement techniques.

A carrier used for the downlink may be referred to as a downlink CC, and a carrier used for the uplink may be referred to as an uplink CC. A combination of a downlink CC and an uplink CC may be referred to as a cell. It is also possible to have a cell consisting of a downlink CC. A UE 115 may be configured with multiple downlink CCs and one or more uplink CCs for carrier aggregation. Multi-layer eNBs 105 may be configured to support communications with UEs over multiple CCs on the downlink and/or uplink. Thus, a UE 115 may receive data and control information on one or more downlink CCs from one multi-layer eNB 105 or from multiple eNBs 105 (e.g., single or multi-layer eNBs). The UE 115 may transmit data and control information on one or more uplink CCs to one or more eNBs 105. Carrier aggregation may be used with both FDD and TDD component carriers. For DL carrier aggregation, multiple bits of ACK/NACK are fed back when multiple DL transmissions occur in one subframe. Up to 22 bits of ACK/NACK may be transmitted using PUCCH format 3 for DL carrier aggregation.

Different coverage enhancement techniques may be employed on different component carriers within the same cell. The various component carriers may thus be individually configured for coverage enhancement techniques, such as bundling. For example, bundling may be employed on one or more component carriers, but may not be employed on all component carriers of a cell. In some embodiments, a difference in coverage enhancement technique may be a difference in bundling size and/or number of repetitions.

FIG. 3 shows a system 300 configured for effective deployment of coverage enhancement techniques, in accordance with various embodiments. The system 300 can include one or more eNBs 105 using one or more component carriers 325 ($CC_1$-$CC_N$) to communicate with UEs 115. The eNBs 105 can transmit information to the UEs 115 over forward (downlink) channels on component carriers 325. In addition, the UEs 115 can transmit information to the eNB 105-a over reverse (uplink) channels on component carriers 325. In describing the various entities of FIG. 3, as well as other figures associated with some of the disclosed embodiments, for the purposes of explanation, the nomenclature associated with a 3GPP LTE or LTE-A wireless network is used. But those skilled in the art will appreciate that the system 300 can operate in other networks such as, but not limited to, an OFDMA wireless network, a CDMA network, a 3GPP2 CDMA2000 network and the like. One or more of the component carriers $CC_1$-$CC_N$ 325 can be in the same frequency operating band (intra-band) or in different operating bands (inter-band) and intra-band CCs can be contiguous or non-contiguous within the operating band.

In the system 300, UEs 115 may be configured with multiple CCs associated with one or more eNBs 105. One CC is designated as the primary CC (PCC) for a UE 115. PCCs may be semi-statically configured by higher layers (e.g., RRC, etc.) on a per-UE basis. Certain uplink control information (UCI) (e.g., ACK/NACK, channel quality information (CQI), scheduling requests (SR), etc.), when transmitted on PUCCH, are carried by the PCC. In some embodiments, a PCC is referred to as a primary cell (PCell). Additional CCs may be designated as secondary CCs (SCCs). SCCs may likewise be semi-statically configured by higher layers (e.g., RRC, etc.) on a per-UE basis. An SCC may be configured for cross-carrier scheduling, such that a designated PCC (or another SCC) schedules resources on the SCC. Alternatively, an SCC may be configured for self-scheduling, such that the SCC schedules resources on a paired spectrum (e.g., UL or DL). In some embodiments, an SCC is referred to as a secondary cell (SCell). However, in some cases, an UL PCC instead of an UL SCC may be used for PUCCH for a given UE. The UEs 115 may be configured with asymmetric DL to UL CC assignments. In LTE/LTE-A, up to 5:1 DL to UL mapping is supported. Thus, one UL CC (e.g., PCC UL) may carry UCI (e.g., ACK/NACK) on PUCCH for up to 5 DL CCs.

In the example illustrated in FIG. 3, UE 115-a is configured with PCC 325-a and SCC 325-b associated with eNB 105-a and SCC 325-c associated with eNB 105-b. The system 300 may be configured to support carrier aggregation using various combinations of FDD and/or TDD CCs 325. For example, some configurations of system 300 may support CA for FDD CCs (e.g., an FDD PCC and one or more FDD SCCs). Other configurations may support CA using TDD CCs (e.g., a TDD PCC and one or more TDD SCCs). In some examples, the TDD SCCs for CA have the same DL/UL configuration while other examples support TDD CA with CCs of different DL/UL configurations.

In some embodiments, the system 300 may support TDD-FDD joint operation, including CA and other types of joint operation (e.g., dual-connectivity when eNBs 105 of the multiple CCs configured for a UE 115 have reduced backhaul capabilities, etc.). TDD-FDD joint operation may allow UEs 115 supporting FDD and TDD CA operation to access both FDD and TDD CCs using CA or in single CC mode. In addition, legacy UEs with various capabilities (e.g., single mode UEs, FDD CA capable UEs, TDD CA capable UEs, etc.), may connect to FDD or TDD carriers of system 300.

The various CCs 325 may each be transmitted according to various coverage enhancement techniques. In some cases, each CC 325 is transmitted according to a different coverage enhancement technique. For example, PCC 325-a and SCC 325-b may be individually configured for coverage enhancements. In some embodiments, SCC 325-b is cross-carrier scheduled from PCC 325-a, and SCC 325-b employs a bundling coverage enhancement technique. In various embodiments, both bundled DL and UL channels may be transmitted and/or received. For example, any or all of a physical broadcast channel (PBCH), PDSCH, PDCCH/EP-DCCH, PUSCH, PUCCH, and/or random access channel (RACH) may be bundled for coverage enhancements.

Bundling may include transmitting (or receiving) several "copies" of a channel (e.g., PBCH) in consecutive transmission time intervals (TTI). A TTI may in some instances be a 1 ms subdivision of frame (as described above), called a subframe. Accordingly, in some instances, for example, a single transport block may be transmitted repeatedly in multiple consecutive subframes, with one set of signaling messages for the whole transmission. As used herein, the term bundling size or bundling length may refer to the number of consecutive TTIs transmitted, or bundled, with a copy of the bundle. For each bundled transmission—for example, bundled DL transmission—a single ACK/NACK may be transmitted. A HARQ process may be employed which accounts for bundling. Thus, each transmission of a channel may not have a corresponding ACK/NACK; rather, the bundled transmission has a corresponding ACK/NACK. For instance, as discussed above for LTE/LTE-A FDD carriers, ACK/NACK information for a HARQ process is generally transmitted 4 subframes after a data transmission. But for a bundled transmission, ACK/NACK information for the entire bundle may be transmitted 4 subframes after the last TTI in the bundle. In such cases, the number of HARQ processes may be reduced, as compared to an unbundled scenario.

The systems 100 and 300 may be configured for HARQ with soft combining. In a scheme employing HARQ with soft combining, a receiver may receive an error-laden data block and store the block in a buffer (e.g., a soft buffer). After a HARQ process, the receiver may receive a retransmission of the error-laden data block; and the receiver may combine the two data blocks. In some cases, the receiver can then decode the combination of data blocks. For both FDD and TDD, a UE 115 stores soft channel bits (e.g., error-laden data blocks). For instance, a UE 115 may store soft channel bits, $n_{SB}$, in a soft buffer for at least $K_{MIMO} \cdot \min(M_{DL\_HARQ}, M_{limit})$ transport blocks (e.g., data blocks) for each serving cell upon a decoding failure, where:

$$n_{SB} = \min\left(N_{cb}, \left\lfloor \frac{N'_{soft}}{C \cdot N^{DL}_{cells} \cdot K_{MIMO} \cdot \min(M_{DL\_HARQ}, M_{limit})} \right\rfloor\right), \quad (1)$$

$N'_{soft}$ is the total number of soft channel bits according to the category of the UE 115, $K_{MIMO}$ is an integer value based on a transmission mode of the UE 115, $M_{DL\_HARQ}$ is the maximum number of downlink HARQ processes, $M_{limit}$ is 8, C is the number of code blocks, $N_{cells}^{DL}$ is the number of configured serving cells (e.g., CCs), and $N_{cb}$ is the number bits for an r-th code block.

$$N_{cb} = \min\left(\left\lfloor \frac{N_{IR}}{C} \right\rfloor, K_w\right)$$

for downlink shared (DL-SCH) and paging (PCH) transport channels; $k_{cb}=K_w$ for uplink shared (UL-SCH) and multicast (MCH) transport channels. $K_w$ is a circular buffer length. $N_{IR}$ denotes the soft buffer size for the r-th code block, and $$N_{IR} = \left\lfloor \frac{N_{soft}}{K_C \cdot K_{MIMO} \cdot \min(M_{DL\_HARQ}, M_{limit})} \right\rfloor, \quad (2)$$

where $N_{soft}$ is the total number of soft channel bits according to the category of the UE 115, $K_C$ is 5 when CA is configured, or 1 or 2, depending on the capability of UE 115 (e.g., the number of layers the UE 115 can support).

As illustrated by Equations 1 and 2, soft buffer management (e.g., soft buffer size) may be described as a function of the number of HARQ process and/or the number of configured CCs. But when bundling is employed, the number of HARQ processes may be different for each CC. So the soft buffer may be partitioned across CCs regardless of whether bundling, or another coverage enhancement technique, is enabled. A soft buffer may thus include effectively equal partitions for each CC. For example, if $n_{SB}$=10,000 bits, and if PCC 325-a and SCC 325-b are both configured, then the soft buffer may be partitioned such that 5,000 bits are allocated to PCC 325-a and 5,000 bits are allocated to SCC 325-b. PCC 325-a and SCC 325-b may have the same or a different number of HARQ processes, which may relate to whether PCC 325-a and SCC 325-b utilize the same or different bundling lengths for coverage enhancement. A soft buffer may thus be partitioned equally for CCs having a different number of HARQ processes or different bundling lengths.

In another embodiment, the soft buffer may include a bundle-dependent soft buffer, which is partitioned equally across HARQ process, but the HARQ processes may be spread unevenly across multiple CCs. The soft buffer may thus have unequal partitioning for each CC, but each HARQ process of each CC may have the same allocation. For example, if $n_{SB}$=10,000 bits, and PCC 325-a is configured, and includes 2 HARQ processes, and SCC 325-b is configured, and includes 4 HARQ processes, then the soft buffer may be partitioned with an effectively equal number of bits allocated to each HARQ process—e.g., each HARQ process of PCC 325-a may be allocated 1,666 bits, and each HARQ process of SCC 325-b may be allocated 1,667 bits. As discussed, whether CCs have the same or a different number of HARQ processes may be a function of whether the CCs utilize the same or different bundling lengths for coverage enhancement. Accordingly, a soft buffer may be portioned based on a number of HARQ processes or bundling length for each of the CCs, and the number of HARQ processes or bundling length may be different for each CC.

In some embodiments, when multiple CCs are configured with coverage enhancements (e.g., bundling), the number of HARQ processes for any such CC may be restricted to a common number of HARQ processes. This may be based on differing coverage enhancement needs. That is, coverage enhancement needs may vary for different CCs. For instance, a CC operating at 800 MHz may have a different coverage enhancement need than a CC operating at 5.8 GHz. Or, in a scenario in which a UE is served by both a macro base station and a pico base station, one CC (e.g., the pico cell) may have a greater coverage enhancement need based on a UE's location relative to the macro and pico cells, and based on the relative transmission limitations of the cells. Additionally or alternatively, coverage enhancement needs may vary among CCs in a CoMP scenario.

Differences in coverage enhancement needs may be determined by a network entity (e.g., a base station controller of base station 105-a or 105-b) based on the differences between CCs. Or, in some cases, UE 115-a may send reports, based on measurements references signals (e.g. reference signal received power (RSRP), reference signal received quality (RSRQ), etc.), for various CCs, which a base station 105 may use to determine coverage enhancement needs. Accordingly, a plurality of CCs may include a subset of CCs needing coverage enhancement. Then each CC of the subset may be restricted to the same number of HARQ processes. Other CCs that do not need coverage enhancements, or that have different coverage enhancement needs, may not have a restricted number of HARQ processes. So, if PCC 325-a, SCC 325-b, and SCC 325-c are each configured, and SCCs 325-b and 325-c have coverage enhancements enabled, but PCC 325-a does not, then SCCs 325-b and 325-c may be restricted to a common number of HARQ processes and PCC 325-a may be unrestricted. The SCCs 325-b, 325-c may thus be restricted to a number of HARQ processes based on transmitting according to some coverage enhancement technique, even if SCC 325-b and SCC 325-c employ different coverage enhancement techniques.

In some cases, if one CC is configured for coverage enhancements, both control and data transmitted on that CC may be bundled. But in some cases, in a CA deployment, it may be possible to allocate DL and UL control on a CC requiring the least coverage enhancement—e.g., the least bundling. It may therefore be advantageous to bundle data and control channels separately, and/or to allocate data and control channels to different CCs. For example, if PCC 325-a and SCC 325-b each include bundling, then all control channels may be allocated to the CC having the least bundling. Data channels may be supported on, and/or allocated to, both CCs with various degrees of bundling. Thus, different HARQ timing may be supported—e.g., if data is bundled, ACK/NACK, and/or other control, may not be bundled. In such cases, a DL HARQ timing may be determined irrespective of whether a CC includes a bundled or an unbundled control channel. Or, in some cases, DL HARQ timing may be determined based on whether a CC includes a bundled or an unbundled control channel. Additionally or alternatively, UL HARQ timing may be determined irrespective of, or based on, whether a CC includes bundled or unbundled control information.

In some embodiments, UL HARQ timing is determined based on whether a CC includes bundled or unbundled control channels. For example, if SCC 325-b is self-scheduled, UL HARQ scheduling and timing may follow coverage-enhancement specific (e.g., bundling specific) scheduling and/or timing for HARQ process. But if, for instance, SCC 325-b is cross-carrier scheduled from PCC 325-a, a HARQ process may be according to a reduced timeline (e.g., a timeline as described above), or a HARQ process may be according to coverage-enhancement specific (e.g., bundling specific) scheduling and/or timing.

The CC acting as the PCell may be selected based on which CC has better coverage of the UE 115-*a*. For example, in the system 300, PCC 325-*a* has the best coverage, as compared with CCs 325-*b*, 325-*c*, and is thus selected as the PCell. In such cases, the SCCs 325-*b*, 325-*c* may be cross-carrier scheduled by PCC 325-*a*, which may signal bundling information for SCCs 325-*b*, 325-*c*, and which may include bundled control (e.g., PDCCH). In some embodiments, an SCell may be unoccupied, but bundled transmissions may be employed even though coverage from the SCell is poor.

The UE 115-*a* provides UCI, as introduced above, to provide the base stations 105 with feedback. The UCI may include channel state information (CSI) and, in some embodiments, the UE 115-*a* may suggest coverage enhancements in UCI. For example, prior to initial access, the UE 115-*a* may perform measurements on the CCs 325, and it may select the CC 325with the lowest path loss (PL) for initial access—e.g., in system 300, PCC 325-*a* may be selected for initial access because it may have the lowest PL. In some cases, while in a connected state, the UE 115-*a* may provide feedback as to which CC 325 has the lowest PL and should be configured as the PCell. The UE 115-*a* may thus measure PL of each of the CCs 325 and transmit feedback, which includes a suggested PCell, based on the measured PL. The base stations 105 may receive the feedback, and the CCs 325 may be configured based on the feedback.

The UE 115-*a* may transmit either or both aperiodic or periodic CSI reports. Generally, aperiodic reports are transmitted on PUSCH, while period reports are transmitted on PUCCH. The UE 115-*a* may operate according to an number of rules which indicate a priority for certain CSI reports in the event that multiple reports are queued to be reported at the same time on the same channel. For example, in case of a collision of a CSI report with PUCCH reporting type 3, 5, or 6 of one serving cell with a CSI report with PUCCH reporting type 1, 1a, 2, 2a, 2b, 2c, or 4 of the same serving cell, the latter CSI report has lower priority and may be "dropped." Thus, the UE 115-*a* may, for a single serving cell, drop CSI reports based on report type.

In some cases, such as for a UE 115-*a* in transmission mode 10, in case of a collision between CSI reports of the same serving cell with PUCCH reporting type of the same priority, and if the CSI reports correspond to different CSI processes, the CSI reports corresponding to all CSI processes except the CSI process with the lowest CSIProcessIndex may be dropped. Additionally or alternatively, for a given subframe and a UE 115-*a* in transmission mode 10, in case of a collision between CSI reports of different serving cells with PUCCH reporting type of the same priority and the CSI reports corresponding to CSI processes with different CSIProcessIndex, the CSI reports of all serving cells except the serving cell with CSI reports corresponding to CSI process with the lowest CSIProcessIndex may be dropped. Thus, the UE 115-*a* may drop CSI reports based on process index.

In some cases, if the UE 115-*a* is configured with more than one serving cell, the UE 115-*a* may transmit a CSI report of one serving cell in any given subframe. For a given subframe, in case of a collision of a CSI report with PUCCH reporting type 3, 5, 6, or 2a of one serving cell with a CSI report with PUCCH reporting type 1, 1a, 2, 2b, 2c, or 4 of another serving cell, the latter CSI may have lower priority and may be dropped. For a given subframe, in case of a collision of a CSI report with PUCCH reporting type 2, 2b, 2c, or 4 of one serving cell with a CSI report with PUCCH reporting type 1 or 1a of another serving cell, the latter CSI report may have the lower priority and may be dropped. Thus, a UE 115-*a* may, for several serving cells, drop CSI reports based on report type.

In other cases, for a given subframe and for a UE 115-*a* in transmission modes 1-9, in case of a collision between CSI reports of different serving cells with PUCCH reporting type of the same priority, the CSI report of the serving cell with the lowest ServCellIndex may be reported, and the CSI report of all other serving cells may be dropped. Additionally or alternatively, for a given subframe and for a UE 115-*a* in transmission mode 10, in case of a collision between CSI reports of different serving cells with PUCCH report type of the same priority and with CSI reports corresponding to CSI processes with the same CSIProcessIndex, the CSI reports of all serving cells except the serving cell with the lowest ServCellIndex may be dropped. Thus, the UE 115-a may drop CSI reports based on cell index.

In cases of parallel transmission from different CCs, when at least one of the CCs employs bundling, some channels (e.g., CSI) may need to be dropped when power and/or dimension limitations drop below a threshold. For instance, if the available power at a UE 115-*a* is less than a power needed for a transmission, as defined by system information, the UE 115-*a* may drop a transmission channel. Additionally or alternatively, if a UE 115-*a* is not configured to transmit a threshold number of layers, the UE 115-*a* may drop a transmission channel. In some embodiments, a channel that already started transmission has priority, and transmission on that channel is completed with the same (e.g., initial) transmission power until the transmission is complete. For example, a constant transmission power may be used for PUSCH in order to maintain phase continuity across subframes. Thus, if a bundled PUSCH began in one CC at some percentage of available transmit power, other CCs may be transmitted at remaining power or dropped if no remaining power is available. The UE 115-*a* may therefore determine to cease transmission of, e.g., SCC 325-*b* when a power limitation or a dimension limitation is below a threshold. The UE 115-*a* may reach this determination based on an initial transmission of PCC 325-*a*.

In some embodiments, the UE 115-*a* may determine to cease transmission of one CC based on the relative priority levels of each CC. For example, a CC with fewer coverage enhancement needs may take priority. Or, for instance, a PCell may take priority. Thus, the UE 115-*a* transmitting on PCC 325-*a* and SCC 325-*b* may determine to cease transmission of, for example, SCC 325-*b* when a power limitation or dimension limitation is below a threshold, because the SCC 325-*b* may need greater coverage enhancements. In other embodiments, a CC with greater coverage enhancement needs may take priority. Thus, the UE 115-*a* transmitting on PCC 325-*a* and SCC 325-*b* may determine to cease transmission on PCC 325-*a* when a power limitation or dimension limitation is below a threshold, because the SCC 325-*b* may need greater coverage enhancements. In still further embodiments, the UE 115-*a* transmitting on PCC 325-*a* and SCC 325-*b* may determine to cease transmission of SCC 325-*b* when a power limitation or a dimension limitation is below a threshold, because the CC configured as the PCell, PCC 325-*a*, takes priority.

Figure 4:
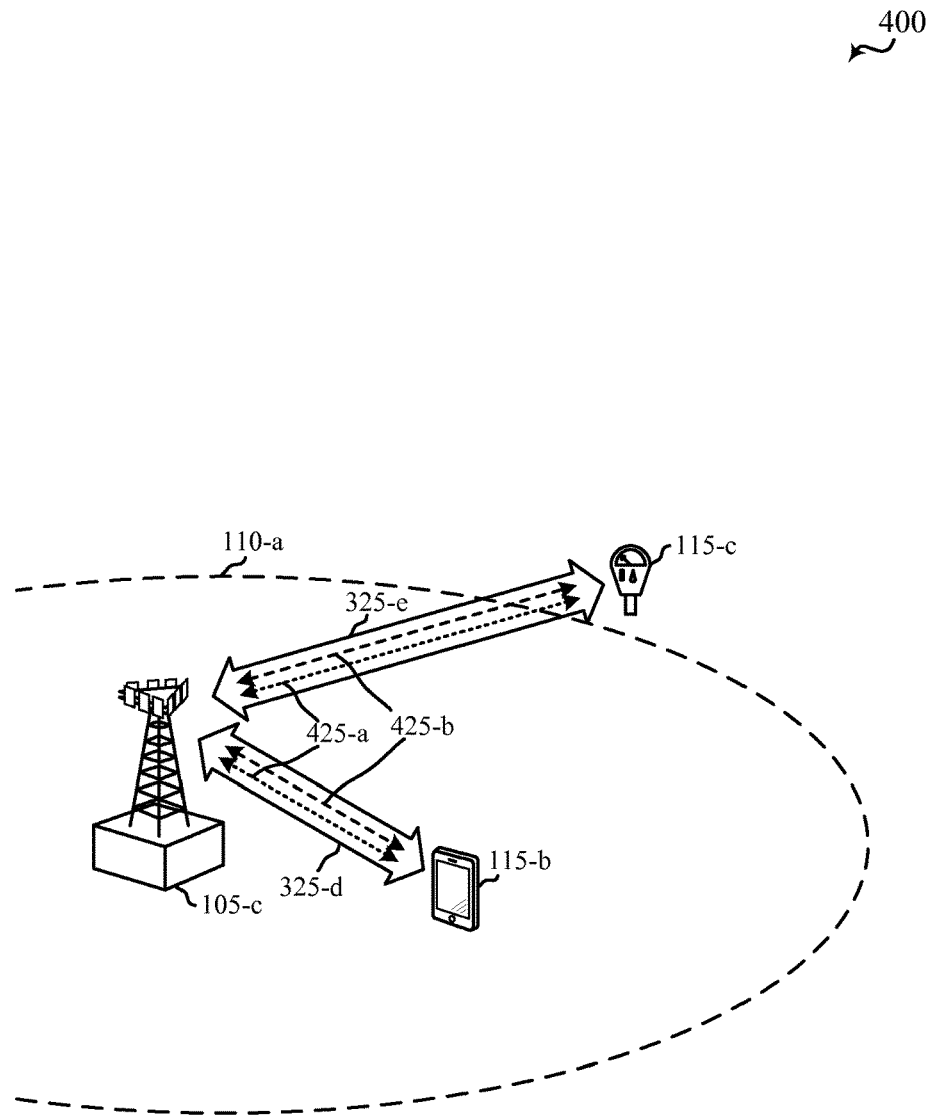
FIG. 4 is a block diagram of system configured for effective deployment of coverage enhancement techniques, in accordance with various embodiments.

Turning next to FIG. 4, shown is a block diagram of system 400 configured for effective deployment of coverage enhancement techniques, in accordance with various embodiments. The system 400 includes a base station 105-*c* that may be in communication with UEs 115 within coverage area 110-a via CCs 325. The various components and/or aspects of the system 400 may be examples of the corresponding components and/or aspects of FIGS. 1 and/or 3. The CCs 325 may each include a number of channels—e.g., a broadcast channel 425-a and/or a unicast channel 425-b.

The UEs 115 may have different capabilities based on the category of each. For example, different categories of UE 115 may support CA (or not), different MIMO dimensions, and the like. Some categories of UE 115 are capable of simultaneously receiving both broadcast and unicast channels, while other categories of UE 115 are incapable of such simultaneous reception. This latter category of UEs 115 may be referred to as "reception-limited UEs," or, in some instances, low-cost UEs or low-cost MTCs. Such reception-limited UEs may, for the control channel (e.g., PDCCH), support wideband operation, but for the data channel (e.g., PDSCH), support narrowband operation and not wideband operation. The UE 115-b may be of a category that is capable of simultaneously receiving broadcast and unicast DL traffic, such as the broadcast 425-a and unicast 425-b channels. The UE 115-c may be of a category that is incapable of such simultaneous transmissions. In cases in which the broadcast channel 425-a and/or the unicast channel 425-b are bundled, the limited capabilities of the UE 115-c may be more pronounced. It may thus be beneficial for various devices—e.g., the base station 105-c and/or the UEs 115—to operate in manner that accounts for the various categories (and limitations) of the UEs 115. Thus, the UE 115-c may not, for example receive (or attempt to receive) a unicast channel 425-b, whenever a broadcast channel 425-a is transmitted. In various embodiments, the UE 115-c may determine not to receive (or attempt to receive) a bundled unicast channel 425-b whenever a bundled broadcast channel 425-a is transmitted. The UE 115-b, however, may receive both unicast 425-b and broadcast 425-a channels simultaneously.

In some embodiments, the UE 115-c identifies a reception time for a broadcast channel to be received at the UE 115-c. Then, based on this identification, the UE 115-c refrains from decoding a unicast channel received at the UE 115-c at the reception time. The broadcast channel 425-a may be bundled, or unbundled, and it may include a system information block (SIB) and/or a PBCH. For example, the UE 115-c may be operating in a discontinuous reception mode in order to conserve power. The UE 115-c may "wake up" from a sleep mode and decode system information, from which it may identify a reception time for a subsequent broadcast. Then the UE 115-c may re-enter a sleep mode. Upon re-waking to receive the broadcast channel at the identified time, the UE 115-c may refrain from decoding a simultaneous unicast transmission. This refraining may allow the UE 115-c to further conserve power (e.g., battery power) because it does not waste resources attempting to decode a channel for which it lacks a present capacity to fully receive.

In some cases, the base station 105-c identifies the capabilities of the UEs 115 and communicates with them according to those capabilities. For example, the base station 105-c may determine a category of the UE 115-c, which may be reception-limited, and which may be identified as a recipient of data to be transmitted from the base station 105-c. (The UE 115-c may be camped on the base station 105-c, for instance.) Based on this category determination, the base station 105-c may then refrain from transmitting unicast data (e.g., the unicast channel 425-b) during a broadcast time. The base station 105-c may then transmit a broadcast channel 425-a, which may be bundled, and which may include a SIB and/or PBCH.

The respective categories of the UEs 115 may impact the coverage enhancement needs of each. For instance, if UE 115-b includes four reception antennas while UE 115-c includes one reception antenna, the UE 115-b is capable of supporting a greater number of MIMO dimensions, and thus the UE 115-c will be more coverage limited compared to UE 115-b. In such scenarios, coverage enhancement techniques utilized by the base station 105-c may be perceived differently by UEs 115 of different categories. It may thus be beneficial if each of the UEs 115 interprets coverage enhancement techniques according to the category of the UE 115. So, for a coverage enhancement technique that includes channel repetition, the channel repetition length may depend on UE category.

In some cases, to enhance coverage, channels may be repeated (e.g., bundled) over a number of subframes according to various repetition levels—e.g., low, medium, and/or high repetition levels. Each repetition level may include a greater number of repetitions (e.g., copies of a channel) than a previous level. A number of repetitions may be referred to as a repetition length. For instance, a low repetition level may include a repetition length of x copies of channel, a medium repetition level may include a repetition length of 2x copies, and a high repetition level may include a repetition length of 4x copies. In some embodiments, subsequent repetition levels use a greater transmission power as compared with a prior level.

The UEs 115 may interpret each repetition level according to a respective UE category. Thus, UE 115-b may interpret repetition levels indicated as low, medium, and high to include, respectively, repetition lengths of L1, L2, and L3, while UE 115-c may interpret the same repetition level indications (low, medium, and high) to include repetition lengths L1', L2', and L3'. Thus, a channel transmitted with a medium repetition level, for example, may be interpreted by UEs 115-b and 115-c to have different repetition lengths depending on the respective category of UEs 115-b and 115-c. Such a coverage enhancement technique may be applied to unicast channels 425-b (e.g., EPDCCH and PDSCH). But in some embodiments, a PBCH level may change depending on whether reception-limited UEs are present or not. Thus, the base station 105-c may adjust the repetition level of a broadcast channel 425-a based on which UEs 115 are likely to receive the broadcast, and the manner in which those UEs 115 are likely to interpret the broadcast. The various repetition levels may result in different degrees of coverage enhancement for different categories of UE 115. For example, for a reception-limited UE 115-c, low, medium, and high repetition levels may result in coverage enhancements of 5 dB, 10 dB, and 15 dB, respectively. While for a UE 115 of a different category (e.g., a UE capable of supporting a greater number of MIMO dimensions), the same low, medium, and high repetition levels may result in coverage enhancements of 3 dB, 6 dB, and 9 dB.

Figure 5A:
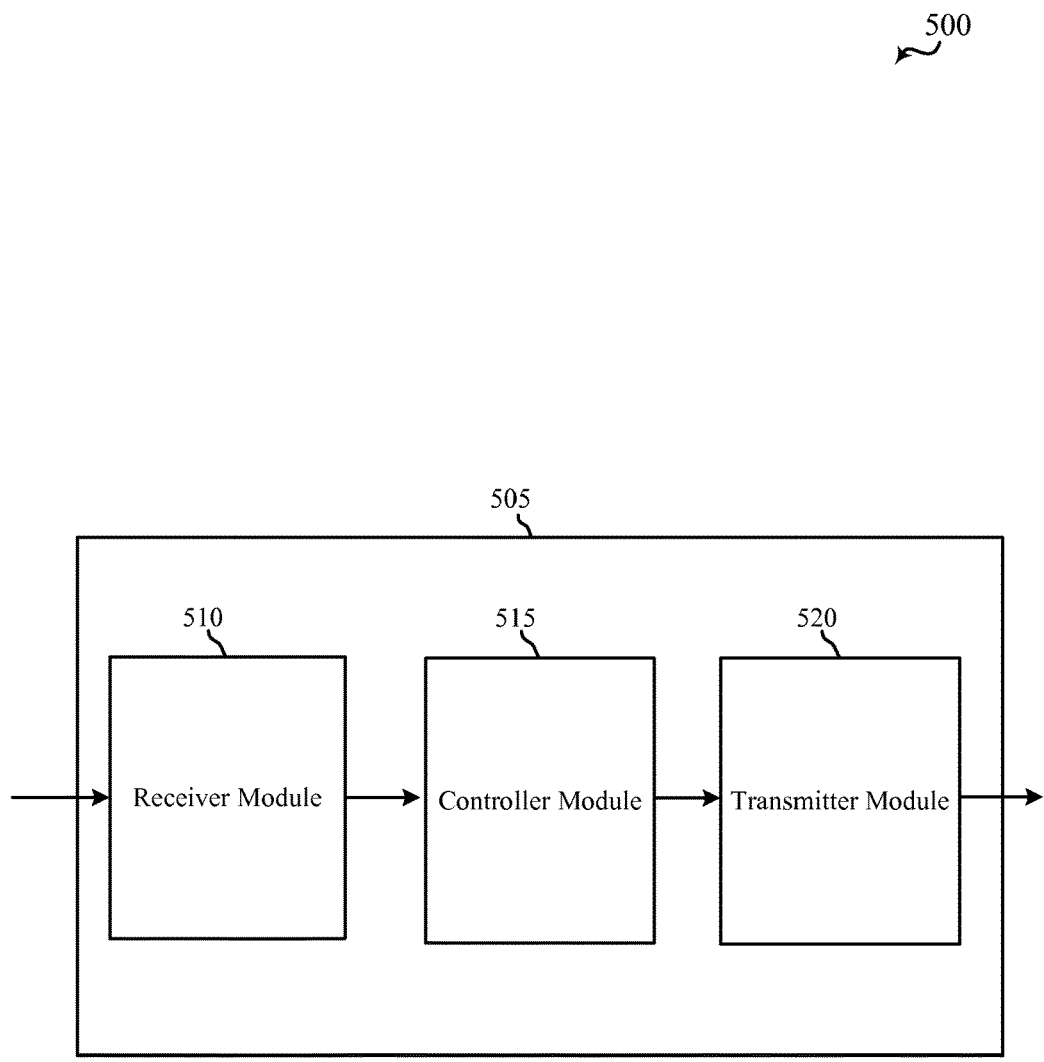
FIGS. 5A, 5B, and 5C are block diagrams of a device(s) configured for effective deployment of coverage enhancement techniques, in accordance with various embodiments.
Figure 5B:
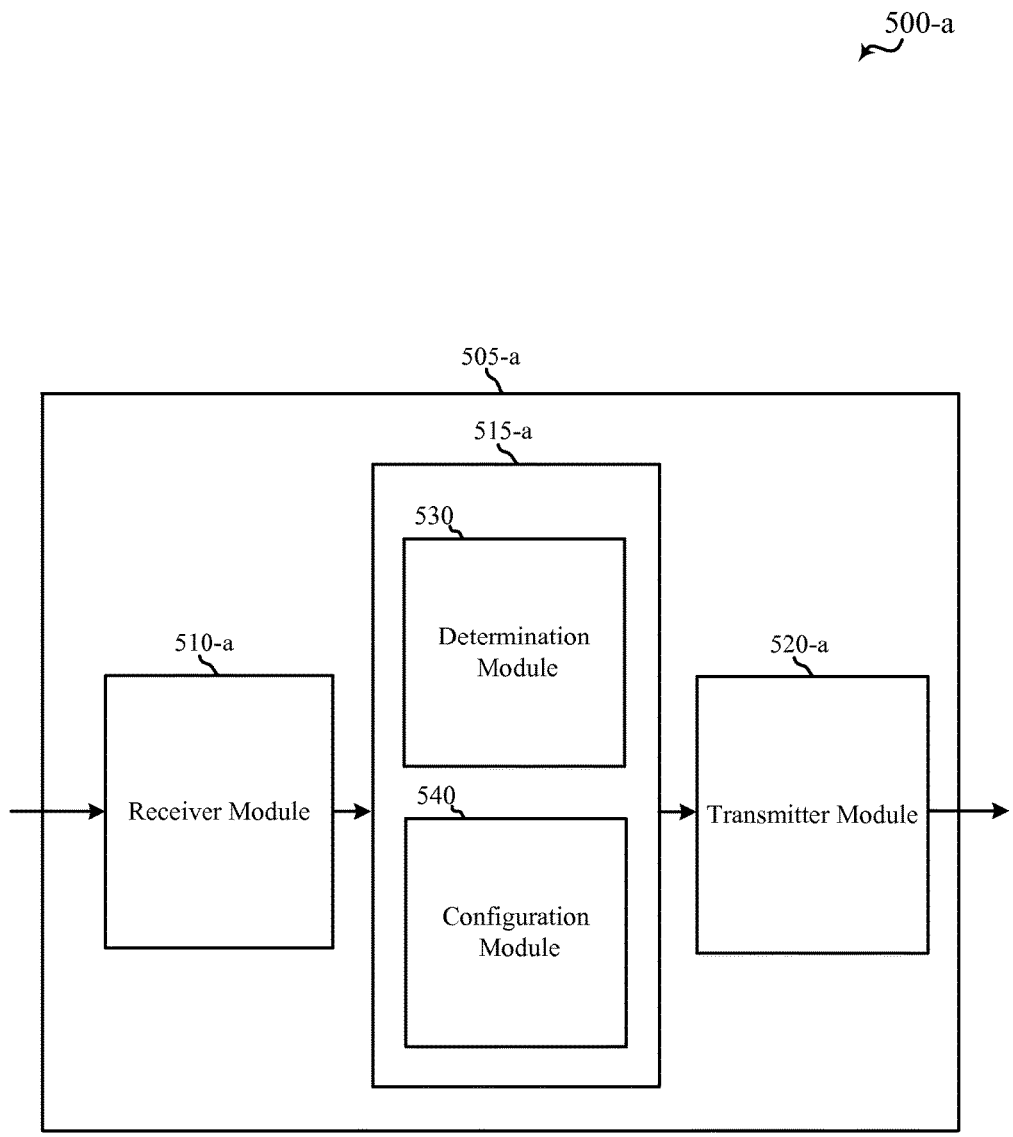
Figure 5C:
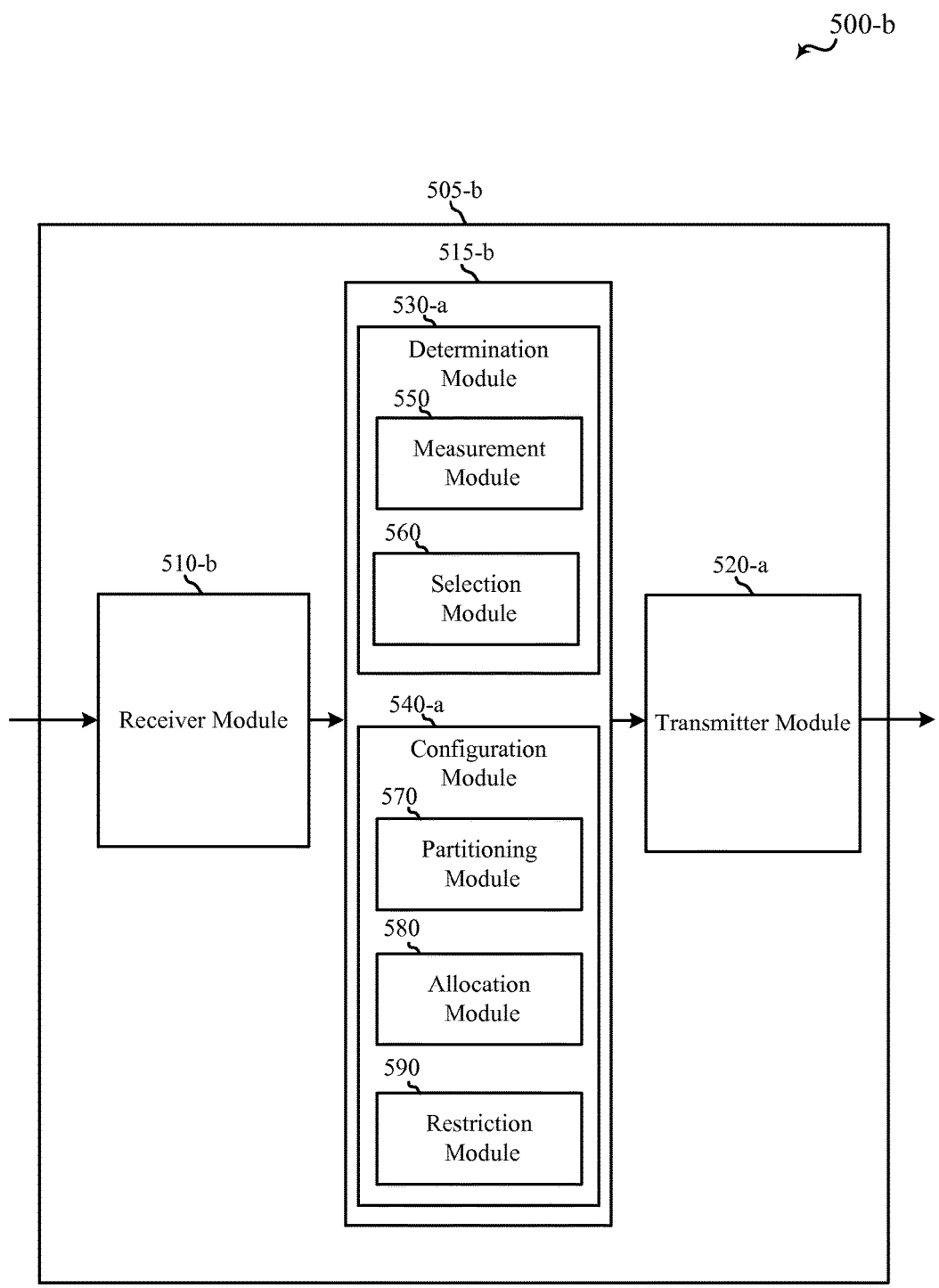

Next, FIGS. 5A, 5B, and 5C depict block diagrams 500 of a device(s) 505 configured for effective deployment of coverage enhancement techniques, in accordance with various embodiments. In various embodiments, the device 505 is an example of various aspects of the base stations 105 and UEs 115 described with reference to the preceding FIGS. The device 505 may include a receiver module 510, a controller module 515, and/or a transmitter module 515, which may each be in communication with one another. The various modules of the device 505 may be means for performing the functions described herein. In some embodiments, one or more aspects of the device 505 is a processor.

The receiver module 510 may be configured to receive a first CC transmitted according to a first coverage enhancement technique and to receive a second CC transmitted according to a second coverage enhancement technique. The transmitter module 515 may be configured to transmit a first CC according to a first coverage enhancement technique and to transmit a second CC according to a second coverage enhancement technique. The controller module 515 may be capable of, and arranged to configure the various CCs, which may employ different coverage enhancement techniques. In some embodiments, the controller module 515 is capable of, and arranged to configure one or more CCs for cross-carrier scheduling.

The receiver module 510 may further be configured to receive a third CC without coverage enhancement. The third CC may be configured with an unrestricted number of HARQ processes; the first and second CCs may have the same or different number of HARQ processes.

FIG. 5B shows a block diagram 500-$a$ of a device 505-$a$ configured for effective deployment of coverage enhancement techniques, in accordance with various embodiments. The device 505-$a$ may be an example of the device 505 of FIG. 5A, and it may be configured to perform the same or similar functions. The device 505-$a$ may include a receiver module 510-$a$, a controller module 515-$a$, and/or a transmitter module 520-$a$, which may each be in communication with one another, and which may be examples of the corresponding modules of FIG. 5A. In some embodiments, one or more aspects of the device 505-$a$ is a processor.

The controller module 515-$a$ may include a determination module 530 and/or a configuration module 540. The determination module 530 may be an aspect of a reception-limited UE 115, and it may be configured to identify a reception time for a broadcast channel to be received at the device 505-$a$. In some embodiments, the determination module 530 identifies a reception time by decoding system information. The configuration module 530, in conjunction with the receiver module 510-$a$, may be configured to refrain from decoding a unicast channel received at the device 505-$a$ at the reception time—e.g., based on identifying the reception time as being for a broadcast channel. The receiver module 510-$a$ may also be configured to receive a broadcast channel, which may be bundled, and which may include a SIB and/or a PBCH.

In other embodiments, the determination module 530 is configured to determine a category of a UE 115 identified as a recipient of data to be transmitted from the device 505-$a$. This determination may be based on UCI received by the receiver module 510-$a$ and conveyed to the determination module 530. The configuration module 540, in conjunction with the transmitter module 520-$a$, may also be configured to refrain from transmitting unicast data to a UE 115 during a broadcast time—e.g., based on determining the category of the UE 115. The transmitter module 520-$a$ may also be configured to transmit a broadcast channel, which may be bundled, and which may include a SIB and/or a PBCH.

In some embodiments, one or more CCs, including CCs transmitted with a broadcast channel, are transmitted with coverage enhancement techniques that include channel repetition of varying levels. The determination module 530 may be configured to determine a repetition length, based on a repetition level, according to a category of UE. For instance, if the device 505-$a$ is an aspect of a reception-limited UE 115, the determination module may be configured to determine a repetition length associated with low, medium, and high repetition levels in accordance with the category (e.g., reception-limited) of the UE 115.

Additionally or alternatively, the determination module 530 may be configured to identify a DL HARQ timing irrespective of, or based on, whether a received and/or transmitted CC includes coverage enhancement (e.g., bundling). In some embodiments, the determination module 530 is configured to determine an UL HARQ timing irrespective of, or based on, whether a received and/or transmitted CC includes coverage enhancement (e.g., bundling). In other cases, the determination module 530 is configured to determine an UL HARQ timing based on whether a received and/or transmitted CC includes a bundled or an unbundled control channel.

FIG. 5C shows a block diagram 500-$b$ of a device 505-$b$ configured for effective deployment of coverage enhancement techniques, in accordance with various embodiments. The device 505-$b$ may be an example of the devices 505 of FIGS. 5A and 5B, and it may be configured to perform the same or similar functions. The device 505-$b$ may include a receiver module 510-$b$, a controller module 515-$b$, and/or a transmitter module 520-$b$, which may each be in communication with one another, and which may be examples of the corresponding modules of FIGS. 5A and 5B. Each of the various submodules of the controller module 515-$b$ may also be in communication with one another. In some embodiments, one or more aspects of the device 505-$b$ is a processor.

The determination module 530-$a$ may include a measurement module 550 and/or a selection module 560. The measurement module may be configured to measure a PL of one or more CCs. The selection module 560 may be configured to select, based on the measured PL, a CC for receiving and/or transmitting. In some embodiments, the selection module 560 is configured to select a CC for initial access of a UE 115 to a base station 105. In other embodiments, the selection module 560, in conjunction with the transmitter module 520-$a$, is configured to select a preferred CC for a PCell based on the measured PL. The combination of the selection module 560 and the transmitter module 520-$a$ may be further configured to transmit feedback with a suggested PCell to a base station 105.

In some embodiments, the receiver module 510-$b$ is configured to receive feedback for a suggest PCell. In such cases, the selection module 560 may be configured to select a CC based on the feedback, and the configuration module 540-$a$ may be capable, and arranged to configure a CC as a PCell based on a selection by the selection module 560.

In other embodiments, the determination module 530-$a$ is configured to drop one or more CCs to compensate for power and/or dimension limitations. For example, the measurement module 550 may be configured to measure a power and/or dimension limitation, and to determine when a limitation is below a threshold. The selection module 560, in conjunction with the transmitter module 520-$a$ may be configured to cease transmission of a CC when a limitation is below a threshold. In some cases, the selection module 560 and the transmitter module 520-$a$ determine to cease transmission of a CC based on an initial transmission. In such cases, the CC on which an initial transmission occurred may have priority. In other cases, the selection module 560 and the transmitter module 520-$a$ may determine to cease transmission of a CC based on coverage enhancement needs of each configured CC. For example, transmission may be ceased on the CC having the least coverage enhancement need. Or, transmission may be ceased on the CC have the greatest coverage enhancement need. In still other cases, the selection module 560 and the transmitter module 520-$a$ may be configured to cease transmission of a CC based on which CC is a PCell. In such cases, the determination module 530-a may be configured to identify a PCell and/or SCells.

In some embodiments, the configuration module 540-a includes a partitioning module 570. The partitioning module 570 may be configured to partition a soft buffer, which may be an aspect of the controller module 515-b and/or the receiver module 510-b. In some cases, the partitioning module 570 is configured to partition a soft buffer equally for each CC. In other examples, the partitioning module 570 is configured to partition the soft buffer based on the number of HARQ processes for each of the CCs. In either case, the number of HARQ processes for each CC may be the same or different.

Additionally or alternatively, the configuration module 540-a may include an allocation module 580. The allocation module 540-a may be configured to allocate control and/or data channels to different CCs. For example, if multiple CCs include coverage enhancements, such as bundling, the allocation module 580 may be configured to allocate all control channels to the CC with the least coverage enhancement need—e.g., the CC having the least bundling. The allocation module 580 may also be configured to allocate data channels to one or more CCs. The transmitter module 520-a may be configured to transmit CCs in accordance with the allocation.

In some embodiments, the configuration module 540-a includes a restriction module 590. The restriction module 590 may be configured to restrict CCs to a common (e.g., the same) number of HARQ processes. The restricting may be based, for example, on whether a CC is transmitted according to a coverage enhancement technique. The restriction module 590 may thus be configured to restrict a CC to a certain number of HARQ processes if the CC employs any coverage enhancement technique. The transmitter module 520-a, in conjunction with the configuration module 540-a, may be configured to transmit CCs with both restricted and unrestricted numbers of HARQ processes.

The components of the devices 505 may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 6:
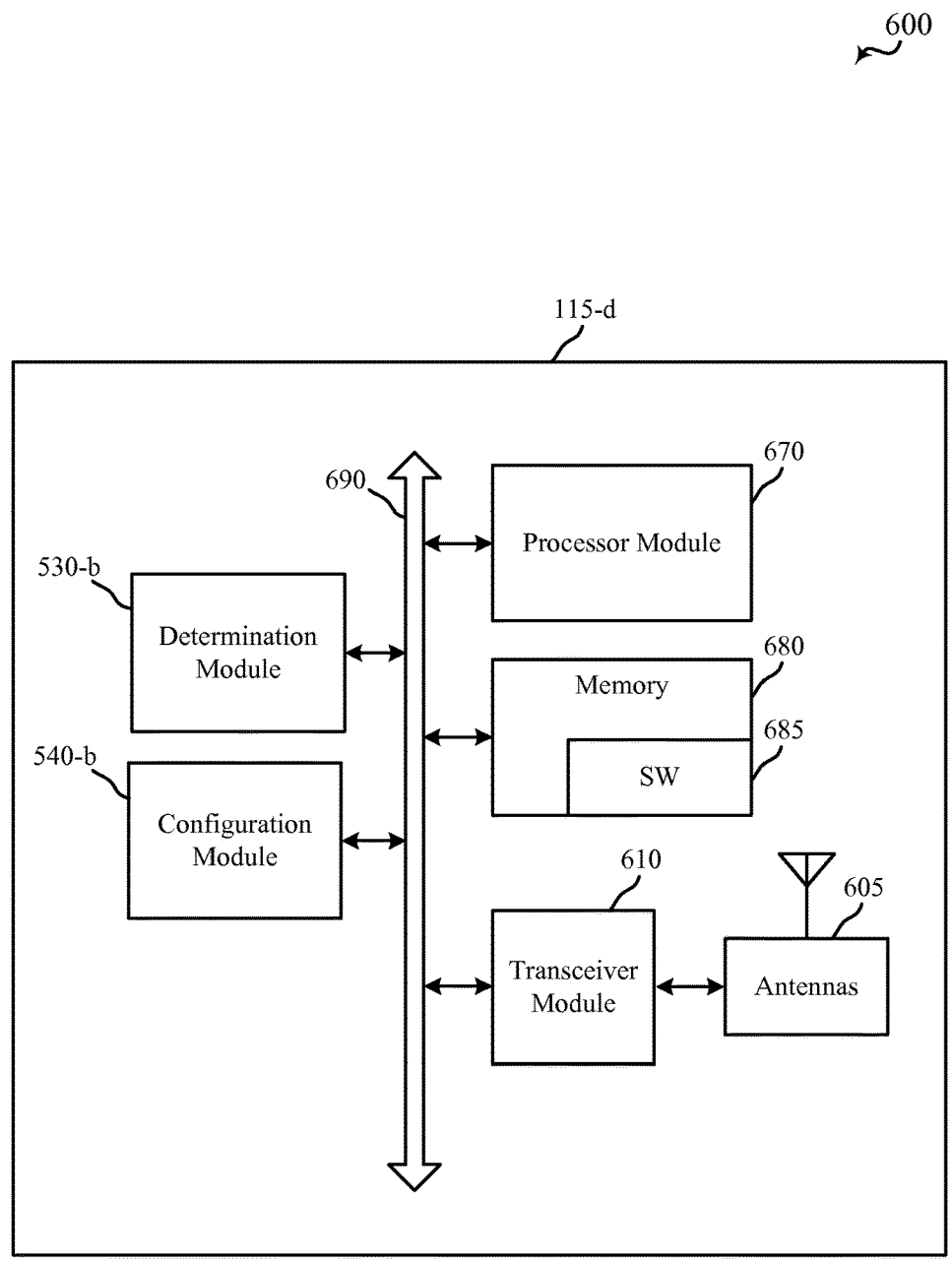
FIG. 6 is a block diagram of UE configured for effective deployment of coverage enhancement techniques, in accordance with various embodiments.

Turning next to FIG. 6, shown is a block diagram 600 of UE 115-d configured for effective deployment of coverage enhancement techniques, in accordance with various embodiments. The UE 115-d may be an MTC device and/or a reception-limited UE. In other examples, the UE 115-d may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The UE 115-d may have an internal power supply (not shown), such as a small battery, to facilitate mobile operation. In some embodiments, the UE 115-d may be an example of the UEs 115 of FIGS. 1, 3, and 4.

The UE 115-d may generally include components for bi-directional voice and data communications including components for transmitting communications and components for receiving communications. The UE 115-d may include antenna(s) 605, a transceiver module 610, a processor module 670, and memory 680 (including software (SW) 685), which each may communicate, directly or indirectly, with each other (e.g., via one or more buses 690). The transceiver module 610 may be configured to communicate bi-directionally, via the antenna(s) 645 and/or one or more wired or wireless links, with one or more networks, as described above. For example, the transceiver module 610 may be configured to communicate bi-directionally with base stations 105 of FIG. 1. The transceiver module 610 may include a modem configured to modulate the packets and provide the modulated packets to the antenna(s) 605 for transmission, and to demodulate packets received from the antenna(s) 605. While the UE 115-d may include a single antenna 605, the UE 115-c may have multiple antennas 605 capable of concurrently transmitting and/or receiving multiple wireless transmissions. The transceiver module 610 may be capable of concurrently communicating with multiple base stations 105 via multiple CCs.

The memory 680 may include random access memory (RAM) and read-only memory (ROM). The memory 680 may store computer-readable, computer-executable software/firmware code 685 containing instructions that are configured to, when executed, cause the processor module 670 to perform various functions described herein (e.g., identifying reception timing, prioritizing channels, prioritizing CCs, partitioning buffers, etc.). Alternatively, the software/firmware code 685 may not be directly executable by the processor module 670 but may be configured to cause a computer (e.g., when compiled and executed) to perform functions described herein.

The processor module 670 may include an intelligent hardware device, e.g., a central processing unit (CPU), a microcontroller, an application-specific integrated circuit (ASIC), etc. The UE 115-d may include a speech encoder (not shown) configured to receive audio via a microphone, convert the audio into packets (e.g., 20 ms in length, 30 ms in length, etc.) representative of the received audio, provide the audio packets to the transceiver module 610, and provide indications of whether a user is speaking.

According to the architecture of FIG. 6, the UE 115-d may further include a determination module 530-b and/or a configuration module 540-b, which may be substantially the same as the determination modules 530 and the configuration modules 540 of FIGS. 5B and 5C. In some cases, the determination module 530-b is configured to perform the functions of the modules 550 and 560, described with reference to FIG. 5C; and the configuration module 540-b may be configured to perform the functions of modules 570, 580, and/or 590, described with reference to FIG. 5C. By way of example, the determination module 530-b and/or the configuration module 540-b may be components of the UE 115-d in communication with some or all of the other components of the UE 115-d via the bus 690. Alternatively, functionality of these modules may be implemented as a component of the transceiver module 610, as a computer program product, and/or as one or more controller elements of the processor module 670.

Figure 7:
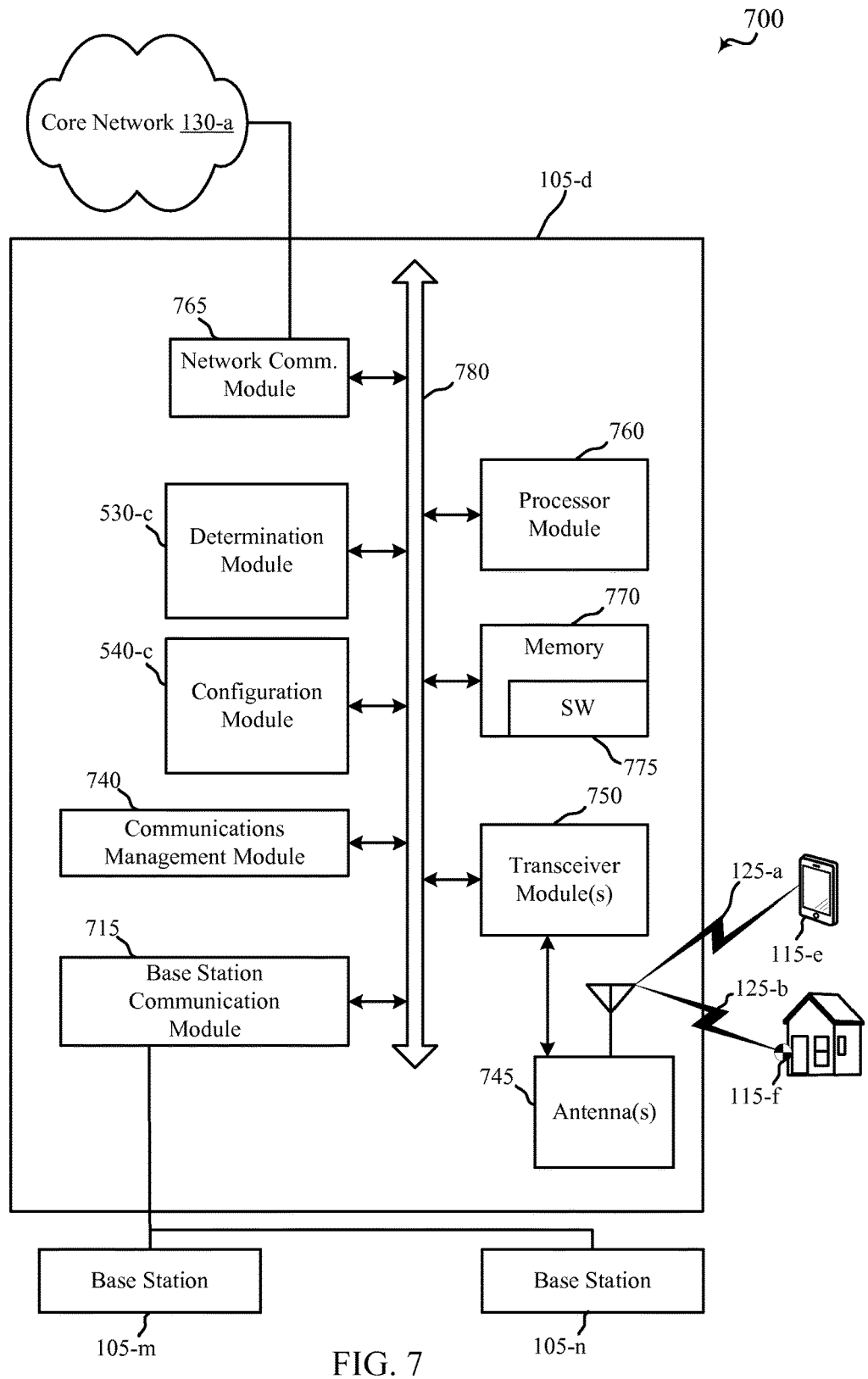
FIG. 7 is a block diagram of an example system configured for effective deployment of coverage enhancement techniques, in accordance with various embodiments.

Next, FIG. 7 shows a block diagram of an example system 700 configured for effective deployment of coverage enhancement techniques, in accordance with various embodiments. This system 700 may be an example of aspects of the systems 100, 300, and/or 400 depicted in FIGS. 1, 3, and 4. The system 700 includes an eNB 105-d configured for communication with UEs 115 over wireless communication links 125. The eNB 105-*d* may be capable of receiving communication links 125 from other base stations (not shown). The eNB 105-*d* may be, for example, an eNB 105 as illustrated in FIGS. 1, 3, and 4.

In some cases, the eNB 105-*d* may have one or more wired backhaul links. The eNB 105-*d* may be a macro eNB 105 having a wired backhaul link (e.g., S1 interface, etc.) to the core network 130-*a*. The eNB 105-*d* may also communicate with other base stations 105, such as base station 105-*m* and base station 105-*n* via inter-base station communication links (e.g., X2 interface, etc.). Each of the base stations 105 may communicate with UEs 115 using the same or different wireless communications technologies. In some cases, eNB 105-*d* may communicate with other base stations such as 105-*m* and/or 105-*n* utilizing base station communication module 715. In some embodiments, base station communication module 715 may provide an X2 interface within an LTE/LTE-A wireless communication network technology to provide communication between some of the base stations 105. In some embodiments, eNB 105-*d* may communicate with other base stations through core network 130-*a*. In some cases, the eNB 105-*d* may communicate with the core network 130-*a* through network communications module 765.

The components for the eNB 105-*d* may be configured to implement aspects discussed above with respect to base stations 105 of FIGS. 1, 3, and 4, and/or devices 505 of FIGS. 5A, 5B, and 5C. For example, the eNB 105-*d* may be configured to receive a first CC transmitted according to a first coverage enhancement technique and to receive a second CC transmitted according to a second coverage enhancement technique. Additionally or alternatively, the eNB 105-*d* may be configured to transmit a first CC according to a first coverage enhancement technique and to transmit a second CC according to a second coverage enhancement technique. The eNB 105-*d* may be capable of configuring the various CCs, which may employ different coverage enhancement techniques.

The base station 105-*d* may include antennas 745, transceiver modules 750, a processor module 760, and memory 770 (including software (SW) 775), and each may be in communication, directly or indirectly, with each other (e.g., over bus system 780). The transceiver modules 750 may be configured to communicate bi-directionally, via the antennas 745, with the UEs 115, which may be UEs of different categories. The transceiver module 750 (and/or other components of the eNB 105-*d*) may also be configured to communicate bi-directionally, via the antennas 745, with one or more other base stations (not shown). The transceiver module 750 may include a modem configured to modulate the packets and provide the modulated packets to the antennas 745 for transmission, and to demodulate packets received from the antennas 745. The base station 105-*d* may include multiple transceiver modules 750, each with one or more associated antennas 745.

The memory 770 may include random access memory (RAM) and read-only memory (ROM). The memory 770 may also store computer-readable, computer-executable software code 775 containing instructions that are configured to, when executed, cause the processor module 760 to perform various functions described herein (e.g., power determination, call processing, database management, message routing, etc.). Alternatively, the software 775 may not be directly executable by the processor module 760 but be configured to cause the computer, e.g., when compiled and executed, to perform functions described herein.

The processor module 760 may include an intelligent hardware device, e.g., a central processing unit (CPU), a microcontroller, an application-specific integrated circuit (ASIC), etc. The processor module 760 may include various special purpose processors such as encoders, queue processing modules, base band processors, radio head controllers, digital signal processors (DSPs), and the like.

According to the architecture of FIG. 7, the eNB 105-*d* may further include a communications management module 740. The communications management module 740 may manage communications with other base stations 105. The communications management module may include a controller and/or scheduler for controlling communications with UEs 115 in cooperation with other base stations 105. For example, the communications management module 740 may perform scheduling for transmissions, including cross-carrier scheduling of CCs, to UEs 115 and/or various interference mitigation techniques such as beamforming and/or joint transmission.

Additionally or alternatively, the eNB 105-d may include a determination module 530-*c*, which may be configured substantially the same as the modules 530 described with reference of FIGS. 5B and 5C. In some cases, the determination module 530-*c* is configured to perform the functions of the modules 550 and/or 560 described with reference to FIG. 5C; and the configuration module 540-*c* may be configured to perform the functions of the modules 570, 580, and/or 590 described with reference to FIG. 5C. In some embodiments, the determination module 530-*c* and/or the configuration module 540-*c* are components of the eNB 105-*d* in communication with some or all of the other components of the eNB 105-*d* via the bus 570. Alternatively, functionality of the determination module 530-*c* and/or the configuration module 540-*c* may be implemented as a component of the transceiver module 750, as a computer program product, as one or more controller elements of the processor module 760, and/or as an element of the communications management module 740.

Figure 8:
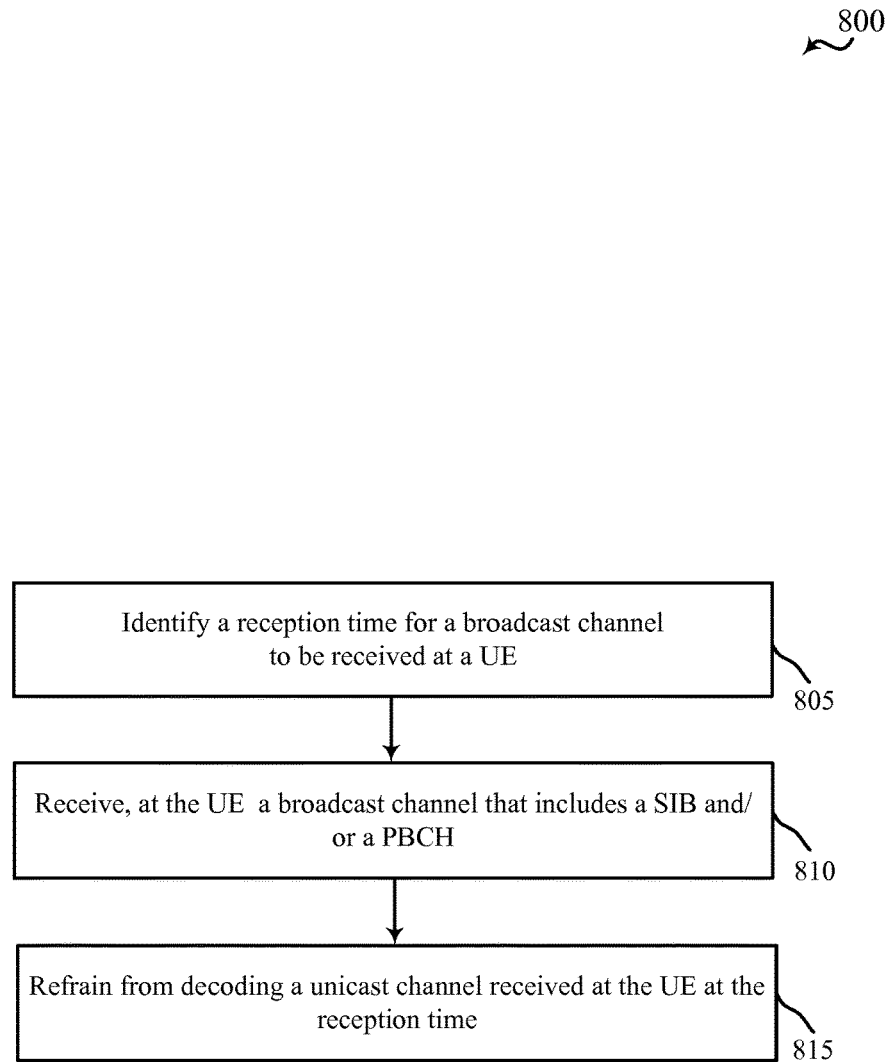
FIG. 8 is a flowchart of a method for effective deployment of coverage enhancement techniques, according to various embodiments.

In FIG. 8, a flowchart of a method 800 for effective deployment of coverage enhancement techniques, according to various embodiments, is shown. The method 800 may be implemented by one or more of the UEs 115 of the preceding figures. Additionally or alternatively, the operations of the method 800 may be performed by the receiver modules 510, the controller modules 515, and/or the transmitter modules 520 described with reference to FIGS. 5A, 5B, and 5C.

At block 805, the method may include identifying a reception time for a broadcast channel to be received at a UE. At block 810, the method may involve receiving, at the UE, a broadcast channel that includes a SIB and/or a PBCH. In some embodiments, at block 815, the method may include refraining from decoding a unicast channel received at the UE at the reception time.

Figure 9:
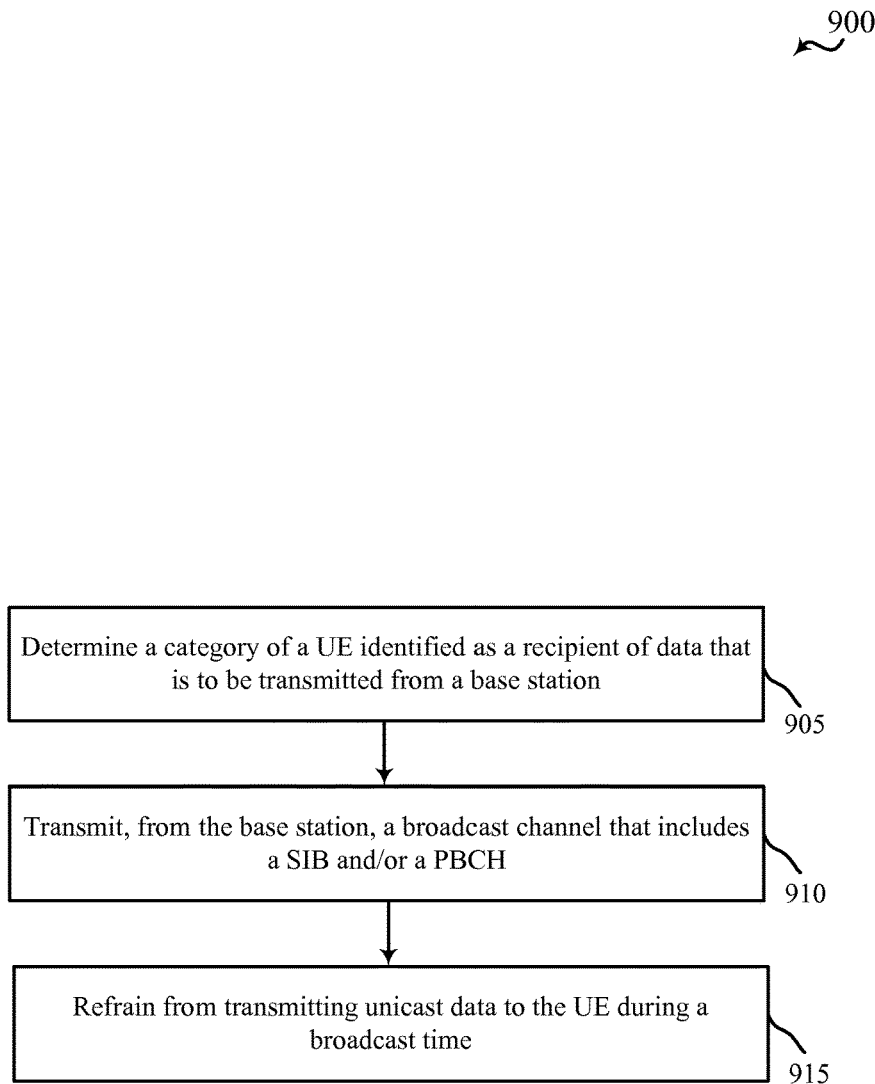
FIG. 9 is a flowchart of a method for effective deployment of coverage enhancement techniques, according to various embodiments.

In FIG. 9, a flowchart of a method 900 for effective deployment of coverage enhancement techniques, according to various embodiments, is shown. The method 900 may be implemented by one or more of the base stations 105 of the preceding figures. Additionally or alternatively, the operations of the method 900 may be performed by the receiver modules 510, the controller modules 515, and/or the transmitter modules 520 described with reference to FIGS. 5A, 5B, and 5C.

At block 905, the method may include determining a category of a UE identified as a recipient of data that is to be transmitted from a base station. At block 910, the method may include transmitting, from the base station, a broadcast channel that includes a SIB and/or a PBCH. In some embodiments, at block 915, the method may include refraining from transmitting unicast data to the UE during a broadcast time.

Figure 10:
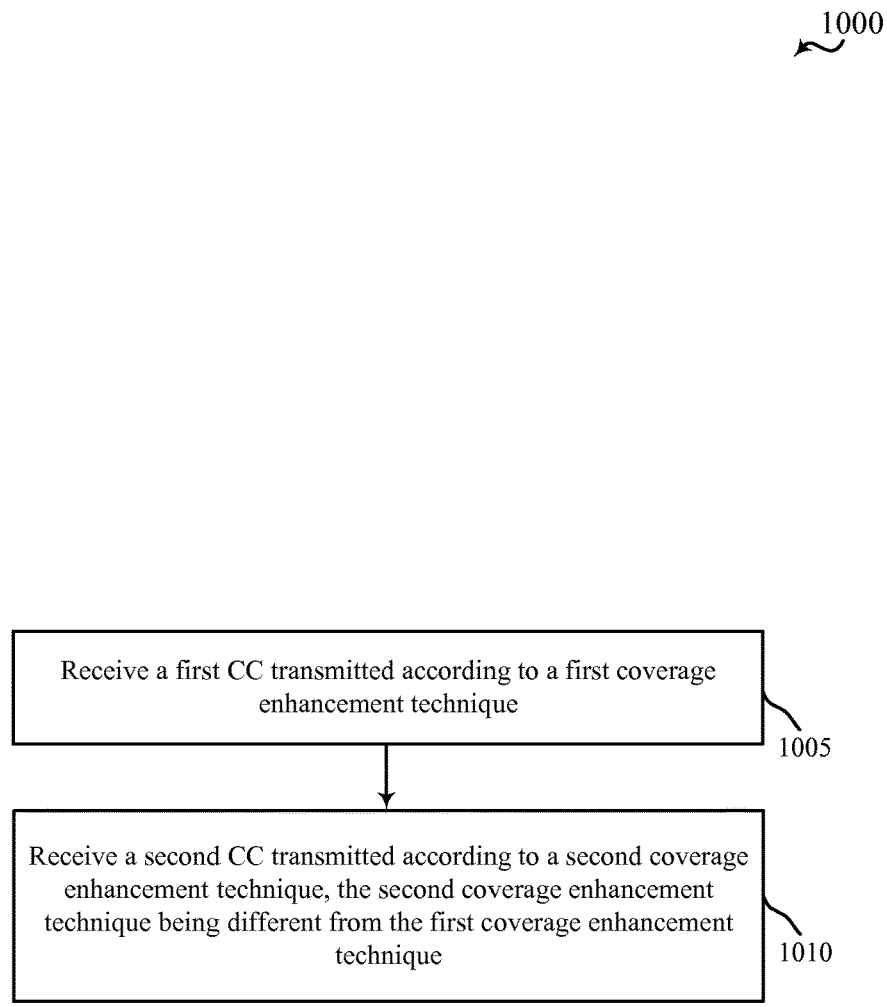
FIG. 10 is a flowchart of a method for effective deployment of coverage enhancement techniques, according to various embodiments.

Next, in FIG. 10, a flowchart of a method 1000 for effective deployment of coverage enhancement techniques, according to various embodiments, is shown. The method 1000 may be implemented by one or more of the UEs 115 and/or the base stations 105 of the preceding figures. Additionally or alternatively, the operations of the method 1000 may be performed by the receiver modules 510, the controller modules 515, and/or the transmitter modules 520 described with reference to FIGS. 5A, 5B, and 5C.

At block 1005, the method may include receiving a first CC transmitted according to a first coverage enhancement technique. Additionally, at block 1010, the method may involve receiving a second CC transmitted according to a second coverage enhancement technique, the second coverage enhancement technique being different from the first coverage enhancement technique.

The first and second CCs may be individually configured for coverage enhancements. In some embodiments, the second CC is cross-carrier scheduled from the first CC, and the second coverage enhancement technique includes bundling. In other embodiments, the first coverage enhancement technique and the second coverage enhancement technique both include bundling. In such cases, all control channels may be allocated to the CC having the least bundling. Additionally or alternatively, data channels may be allocated to both CCs.

In some embodiments, one or both of the first and second coverage enhancement techniques includes channel repetition. The length of the channel repetition may be interpreted by a UE based on a category of the UE. In such cases, either or both the first CC and the second CC may include a broadcast channel.

Figure 11:
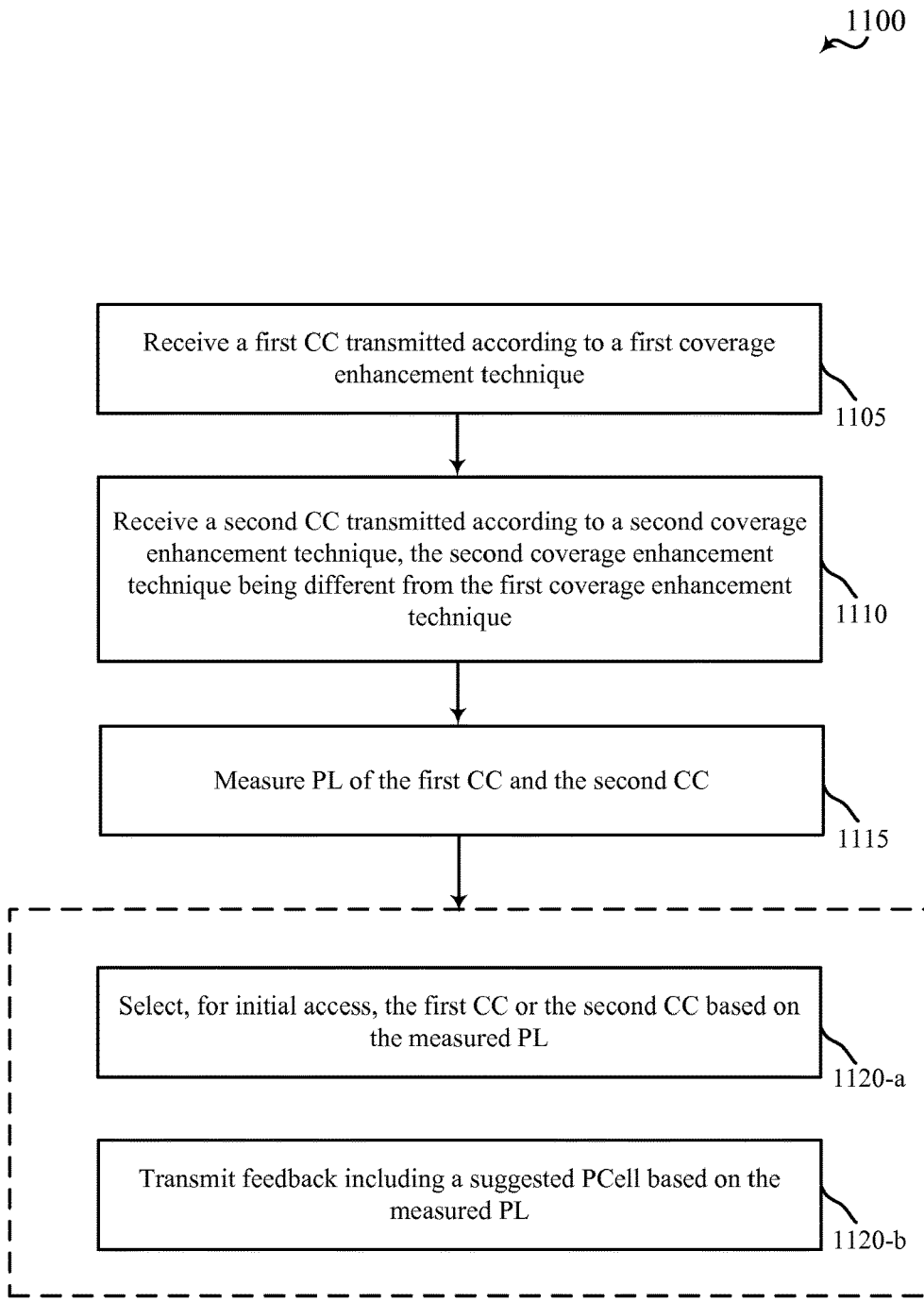
FIG. 11 is a flowchart of a method for effective deployment of coverage enhancement techniques, according to various embodiments.

In FIG. 11, a flowchart of a method 1100 for effective deployment of coverage enhancement techniques, according to various embodiments, is shown. The method 1100 may be an example of the method 1000, and it may be implemented by one or more of the UEs 115 and/or the base stations 105 of the preceding figures. Additionally or alternatively, the operations of the method 1100 may be performed by the receiver modules 510, the controller modules 515, and/or the transmitter modules 520 described with reference to FIGS. 5A, 5B, and 5C.

At block 1105, the method may include receiving a first CC transmitted according to a first coverage enhancement technique. Additionally, at block 1110, the method may involve receiving a second CC transmitted according to a second coverage enhancement technique, the second coverage enhancement technique being different from the first coverage enhancement technique. At block 1115, the method may include measuring PL of the first CC and the second CC. In various embodiments, the method may include selecting, for initial access, the first CC or the second CC based on the measured PL, as shown in block 1120-a. Or, the method may include transmitting feedback including a suggested PCell based on the measured PL, as shown in block 1120-b.

Figure 12:
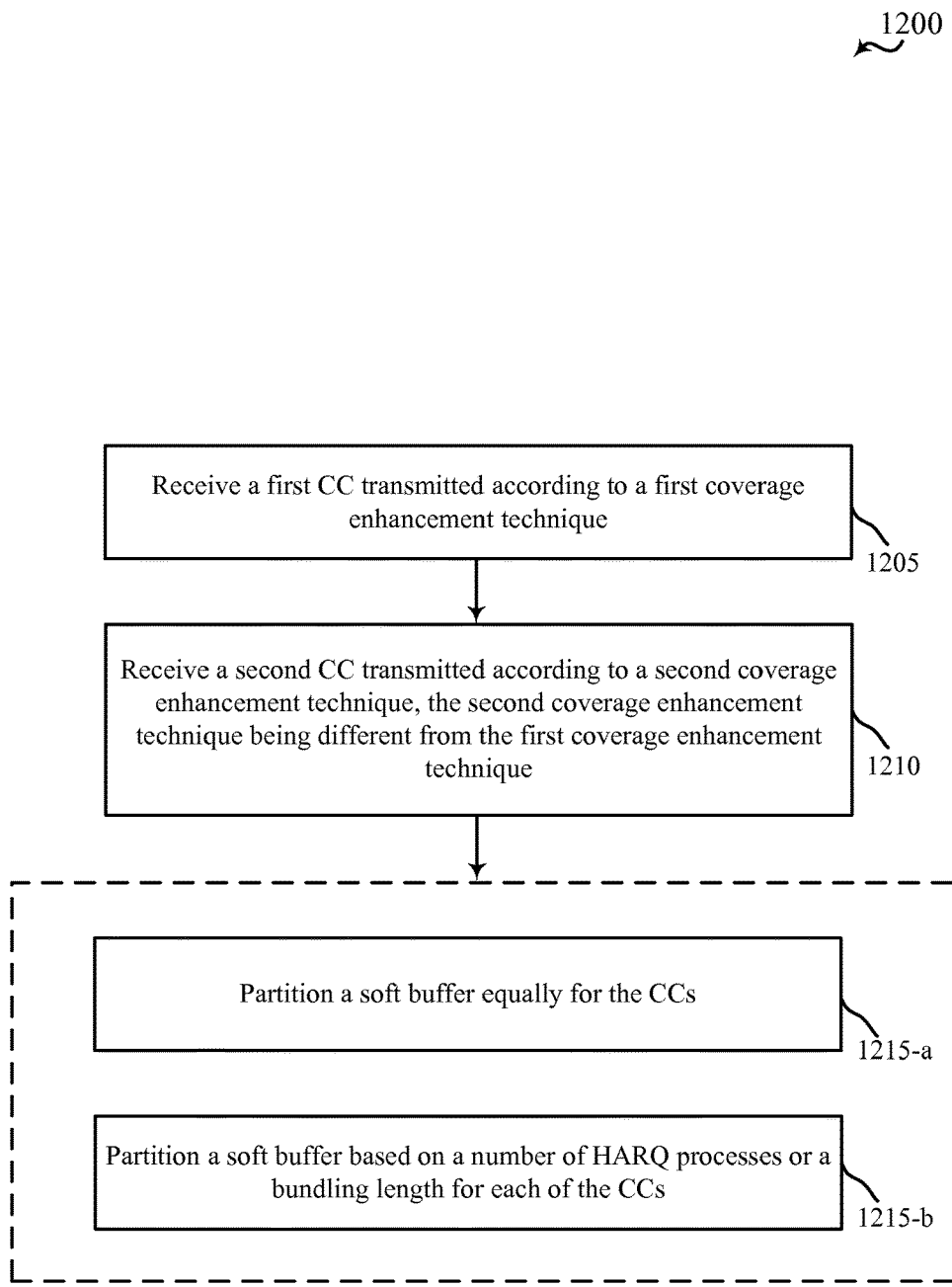
FIG. 12 is a flowchart of a method for effective deployment of coverage enhancement techniques, according to various embodiments.

In FIG. 12, a flowchart of a method 1200 for effective deployment of coverage enhancement techniques, according to various embodiments, is shown. The method 1200 may be an example of the methods 1000 and/or 1100, and it may be implemented by one or more of the UEs 115 and/or the base stations 105 of the preceding figures. Additionally or alternatively, the operations of the method 1200 may be performed by the receiver modules 510, the controller modules 515, and/or the transmitter modules 520 described with reference to FIGS. 5A, 5B, and 5C.

At block 1205, the method may include receiving a first CC transmitted according to a first coverage enhancement technique. Additionally, at block 1210, the method may involve receiving a second CC transmitted according to a second coverage enhancement technique, the second coverage enhancement technique being different from the first coverage enhancement technique. In various embodiments, the method may include partitioning a soft buffer equally for the CCs, as shown in block 1215-a. Or, the method may include partitioning a soft buffer based on a number of HARQ processes for each of the CCs, as shown in block 1215-b.

Figure 13:
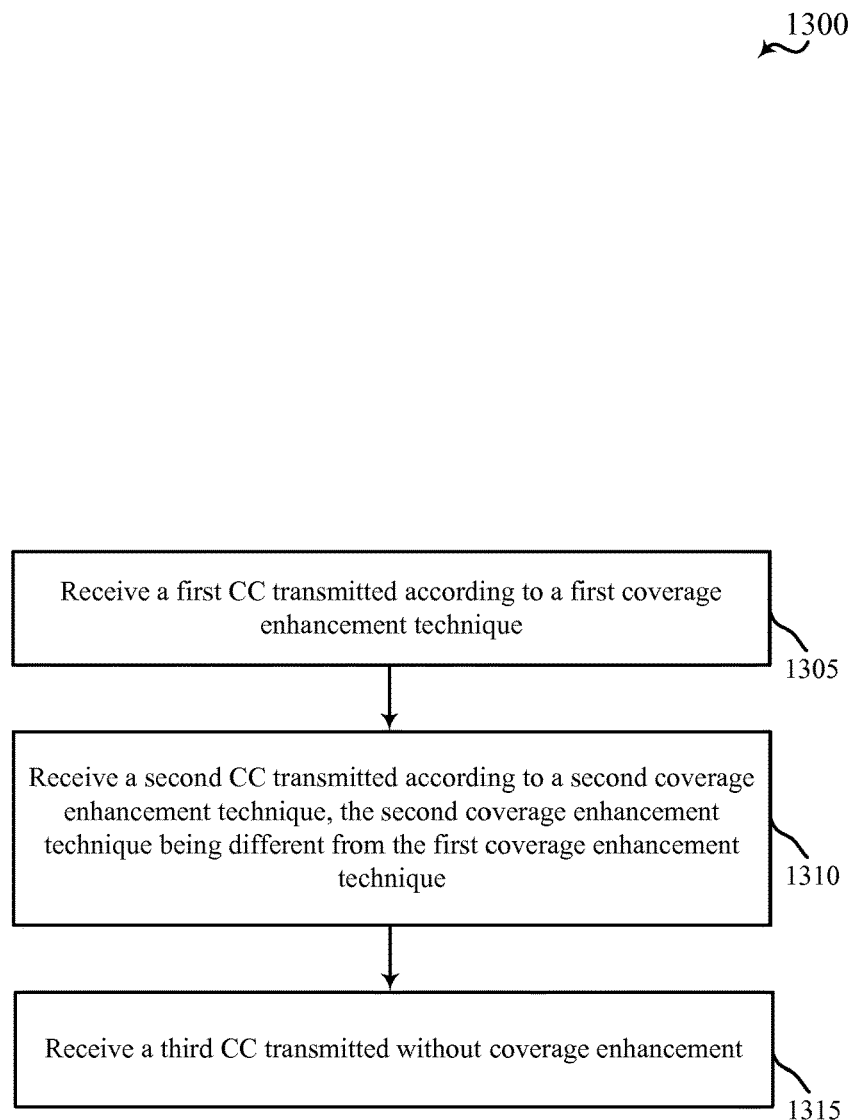
FIG. 13 is a flowchart of a method for effective deployment of coverage enhancement techniques, according to various embodiments.

In FIG. 13, a flowchart of a method 1300 for effective deployment of coverage enhancement techniques, according to various embodiments, is shown. The method 1300 may be an example of the methods 1000, 1100, and/or 1200, and it may be implemented by one or more of the UEs 115 and/or the base stations 105 of the preceding figures. Additionally or alternatively, the operations of the method 1300 may be performed by the receiver modules 510, the controller modules 515, and/or the transmitter modules 520 described with reference to FIGS. 5A, 5B, and 5C.

At block 1305, the method may include receiving a first CC transmitted according to a first coverage enhancement technique. Additionally, at block 1310, the method may involve receiving a second CC transmitted according to a second coverage enhancement technique, the second coverage enhancement technique being different from the first coverage enhancement technique. The method may also include, at block 1315, receiving a third CC transmitted without coverage enhancement. The third CC may be configured with an unrestricted number of HARQ processes, while the first and second CCs may be configured with a common number of HARQ processes.

Figure 14:
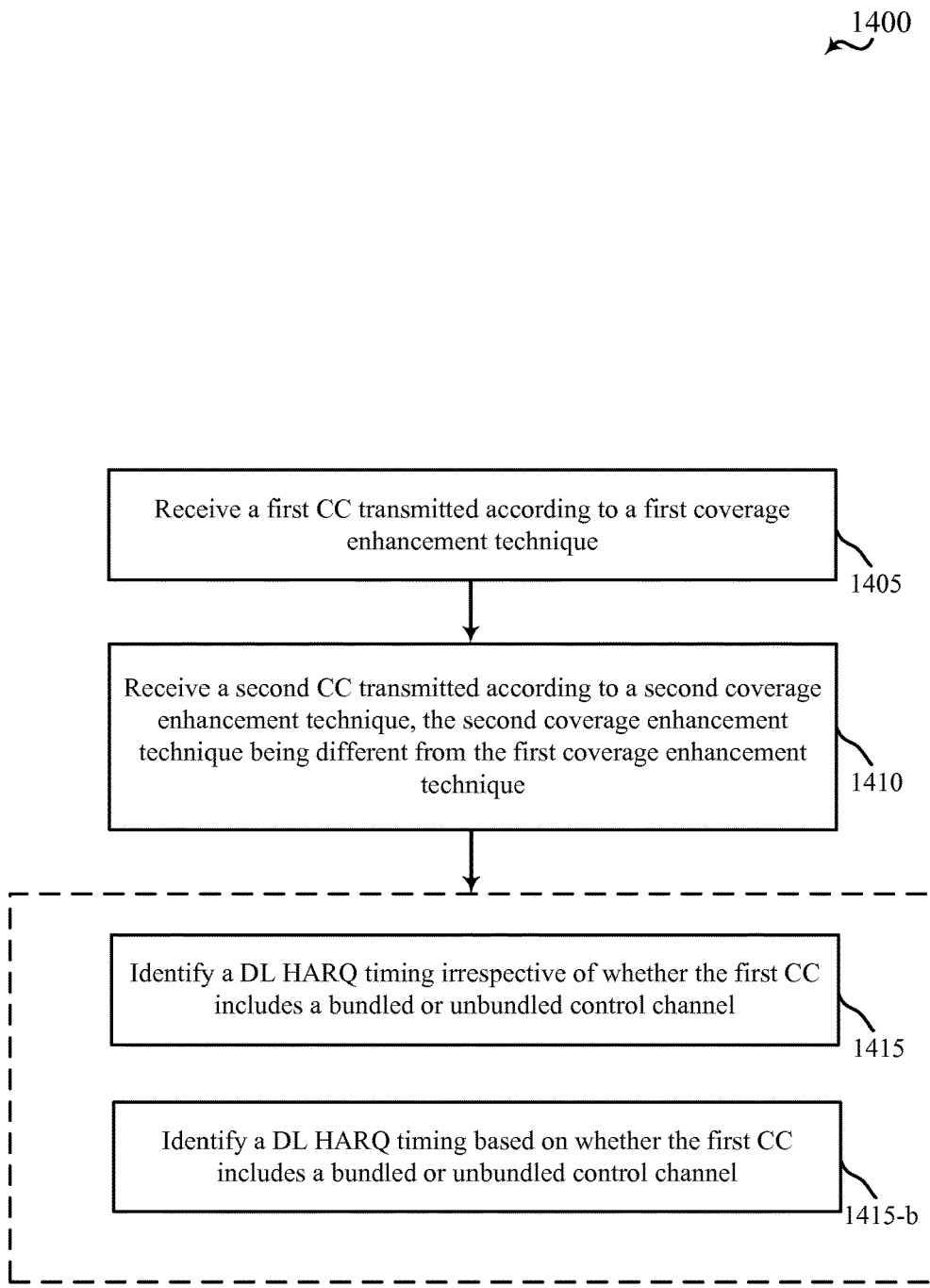
FIG. 14 is a flowchart of a method for effective deployment of coverage enhancement techniques, according to various embodiments.

In FIG. 14, a flowchart of a method 1400 for effective deployment of coverage enhancement techniques, according to various embodiments, is shown. The method 1400 may be an example of the methods 1000, 1100, 1200, and/or 1300, and it may be implemented by one or more of the UEs 115 and/or the base stations 105 of the preceding figures. Additionally or alternatively, the operations of the method 1400 may be performed by the receiver modules 510, the controller modules 515, and/or the transmitter modules 520 described with reference to FIGS. 5A, 5B, and 5C.

At block 1405, the method may include receiving a first CC transmitted according to a first coverage enhancement technique. Additionally, at block 1410, the method may involve receiving a second CC transmitted according to a second coverage enhancement technique, the second coverage enhancement technique being different from the first coverage enhancement technique. The method may also include, at block 1415-a, identifying a DL HARQ timing irrespective of; or the method may include, at block 1415-b, identifying a DL HARQ timing based on whether the first CC includes a bundled or an unbundled control channel.

Figure 15:
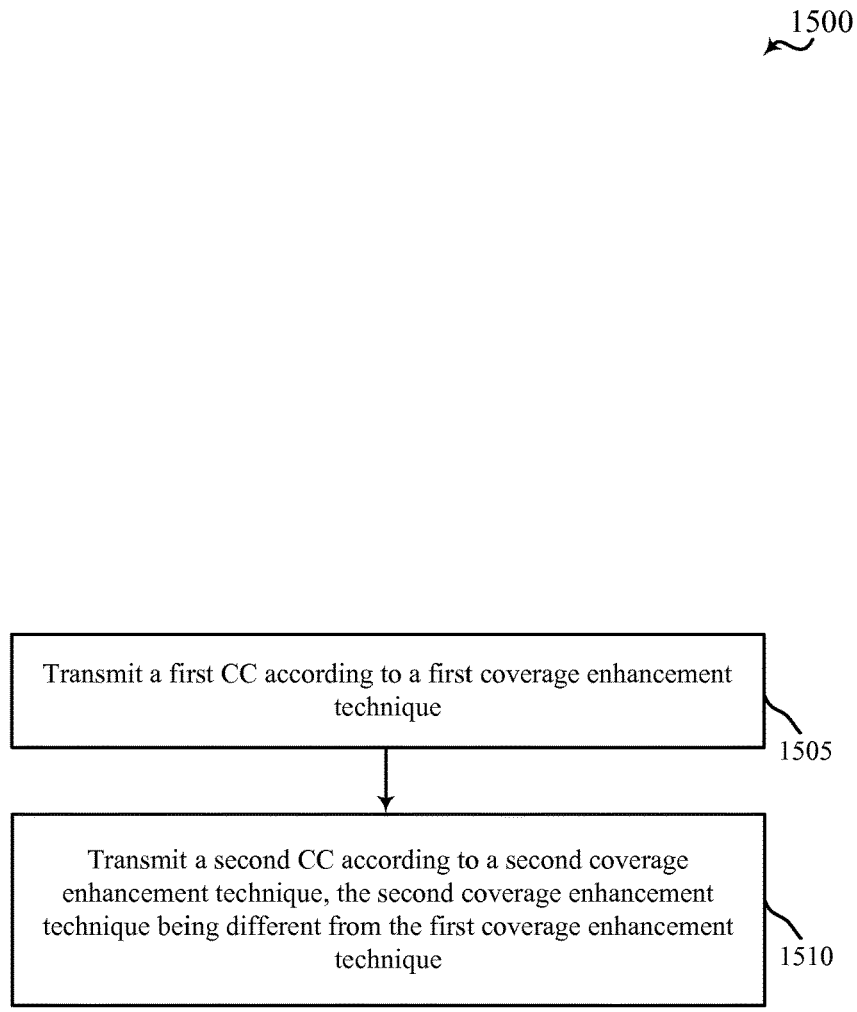
FIG. 15 is a flowchart of a method for effective deployment of coverage enhancement techniques, according to various embodiments.

Next, in FIG. 15, a flowchart of a method 1500 for effective deployment of coverage enhancement techniques, according to various embodiments, is shown. The method 1500 may be implemented by one or more of the UEs 115 and/or the base stations 105 of the preceding figures. Additionally or alternatively, the operations of the method 1500 may be performed by the receiver modules 510, the controller modules 515, and/or the transmitter modules 520 described with reference to FIGS. 5A, 5B, and 5C.

At block 1505, the method may include transmitting a first CC according to a first coverage enhancement technique. Additionally, at block 1510, the method may involve transmitting a second CC according to a second coverage enhancement technique, the second coverage enhancement technique being different from the first coverage enhancement technique.

The first and second CCs may be individually configured for coverage enhancements. In some embodiments, the second CC is cross-carrier scheduled from the first CC, and the second coverage enhancement technique includes bundling. In some embodiments, one or both of the first and second coverage enhancement techniques includes channel repetition. The length of the channel repetition may be interpreted by a UE based on a category of the UE. In such cases, either or both the first CC and the second CC may include a broadcast channel.

Figure 16:
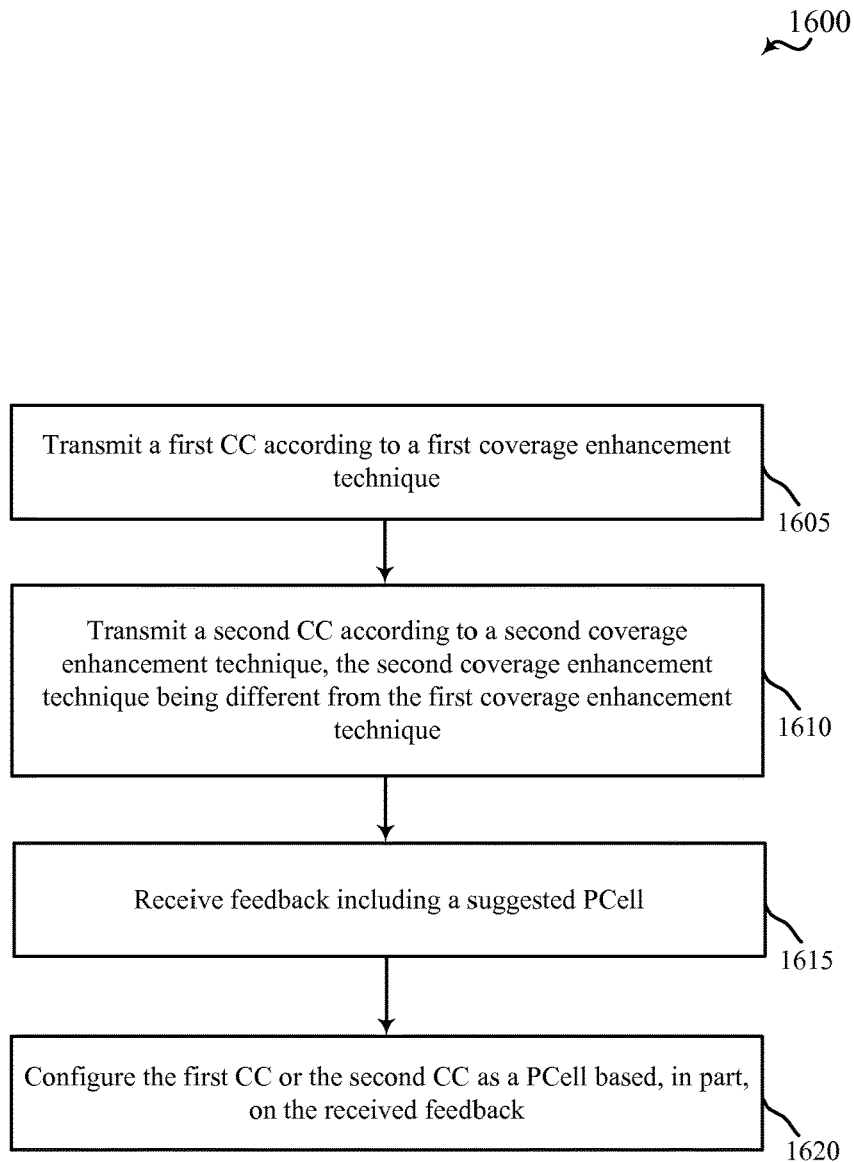
FIG. 16 is a flowchart of a method for effective deployment of coverage enhancement techniques, according to various embodiments.

In FIG. 16, a flowchart of a method 1600 for effective deployment of coverage enhancement techniques, according to various embodiments, is shown. The method 1600 may be an example of the method 1500, and it may be implemented by one or more of the UEs 115 and/or the base stations 105 of the preceding figures. Additionally or alternatively, the operations of the method 1600 may be performed by the receiver modules 510, the controller modules 515, and/or the transmitter modules 520 described with reference to FIGS. 5A, 5B, and 5C.

At block 1605, the method may include transmitting a first CC according to a first coverage enhancement technique. Additionally, at block 1610, the method may involve transmitting a second CC according to a second coverage enhancement technique, the second coverage enhancement technique being different from the first coverage enhancement technique At block 1615, the method may include receiving feedback that includes a suggested PCell. At block 1620, the method may involve configuring the first CC or the second CC as a PCell based at least in part on the received feedback.

Figure 17:
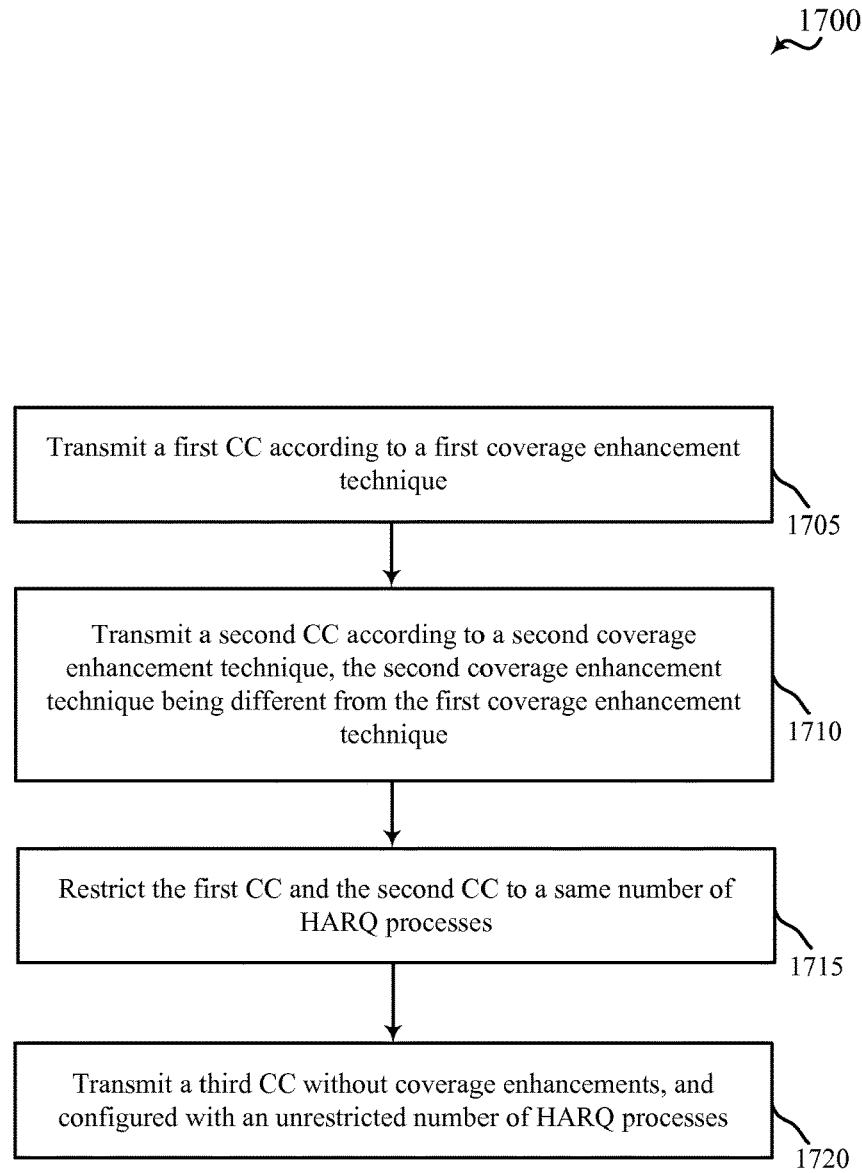
FIG. 17 is a flowchart of a method for effective deployment of coverage enhancement techniques, according to various embodiments.

In FIG. 17, a flowchart of a method 1700 for effective deployment of coverage enhancement techniques, according to various embodiments, is shown. The method 1700 may be an example of the methods 1500 and/or 1600, and it may be implemented by one or more of the UEs 115 and/or the base stations 105 of the preceding figures. Additionally or alternatively, the operations of the method 1700 may be performed by the receiver modules 510, the controller modules 515, and/or the transmitter modules 520 described with reference to FIGS. 5A, 5B, and 5C.

At block 1705, the method may include transmitting a first CC according to a first coverage enhancement technique. Additionally, at block 1710, the method may involve transmitting a second CC according to a second coverage enhancement technique, the second coverage enhancement technique being different from the first coverage enhancement technique. At block 1715, the method may include restricting the first CC and the second CC to a same number of HARQ processes. Then, at block 1720, the method may involve transmitting a third CC without coverage enhancements, and configured with an unrestricted number of HARQ processes.

Figure 18:
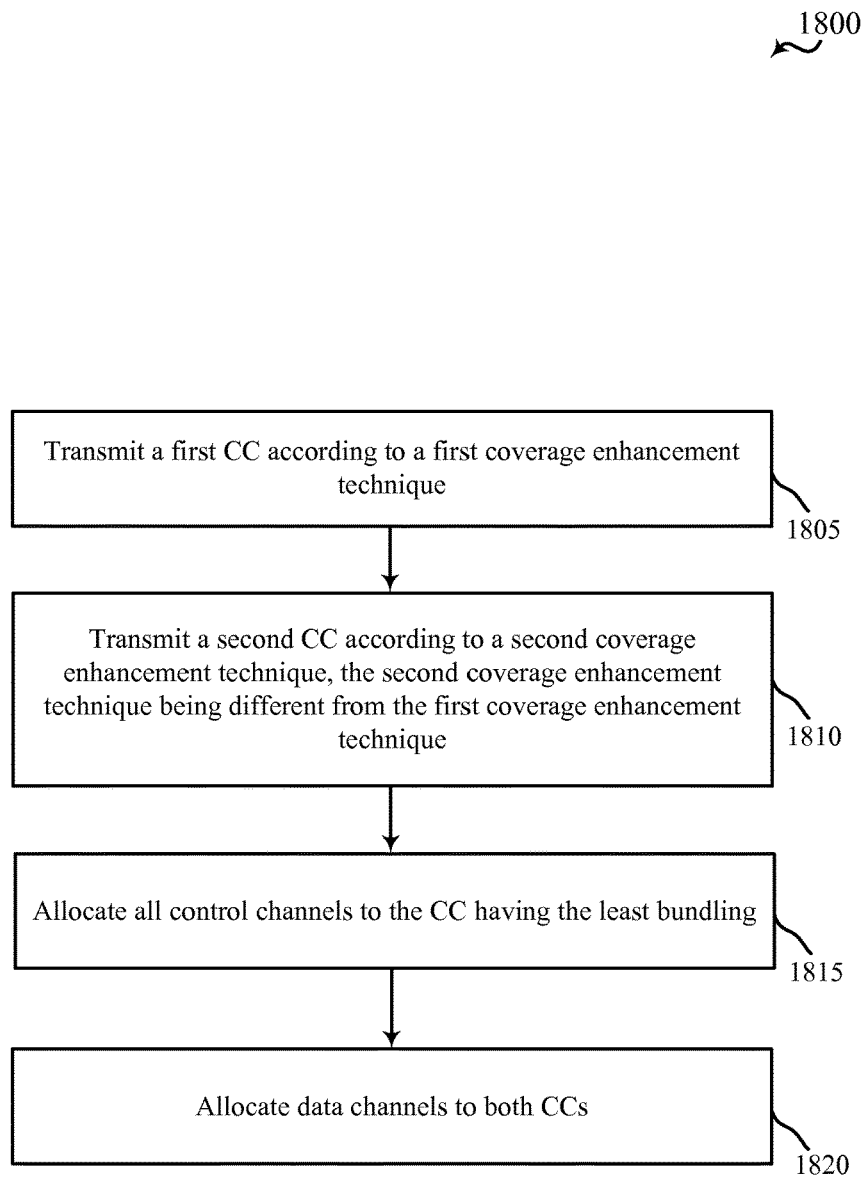
FIG. 18 is a flowchart of a method for effective deployment of coverage enhancement techniques, according to various embodiments.

In FIG. 18, a flowchart of a method 1800 for effective deployment of coverage enhancement techniques, according to various embodiments, is shown. The method 1800 may be an example of the methods 1500, 1600, and/or 1700, and it may be implemented by one or more of the UEs 115 and/or the base stations 105 of the preceding figures. Additionally or alternatively, the operations of the method 1800 may be performed by the receiver modules 510, the controller modules 515, and/or the transmitter modules 520 described with reference to FIGS. 5A, 5B, and 5C.

At block 1805, the method may include transmitting a first CC according to a first coverage enhancement technique. Additionally, at block 1810, the method may involve transmitting a second CC according to a second coverage enhancement technique, the second coverage enhancement technique being different from the first coverage enhancement technique. At block 1815, the method may include allocating all control channels to the CC having the least bundling. In some embodiments, at block 1820, the method may involve allocating data channels to both CCs.

Figure 19:
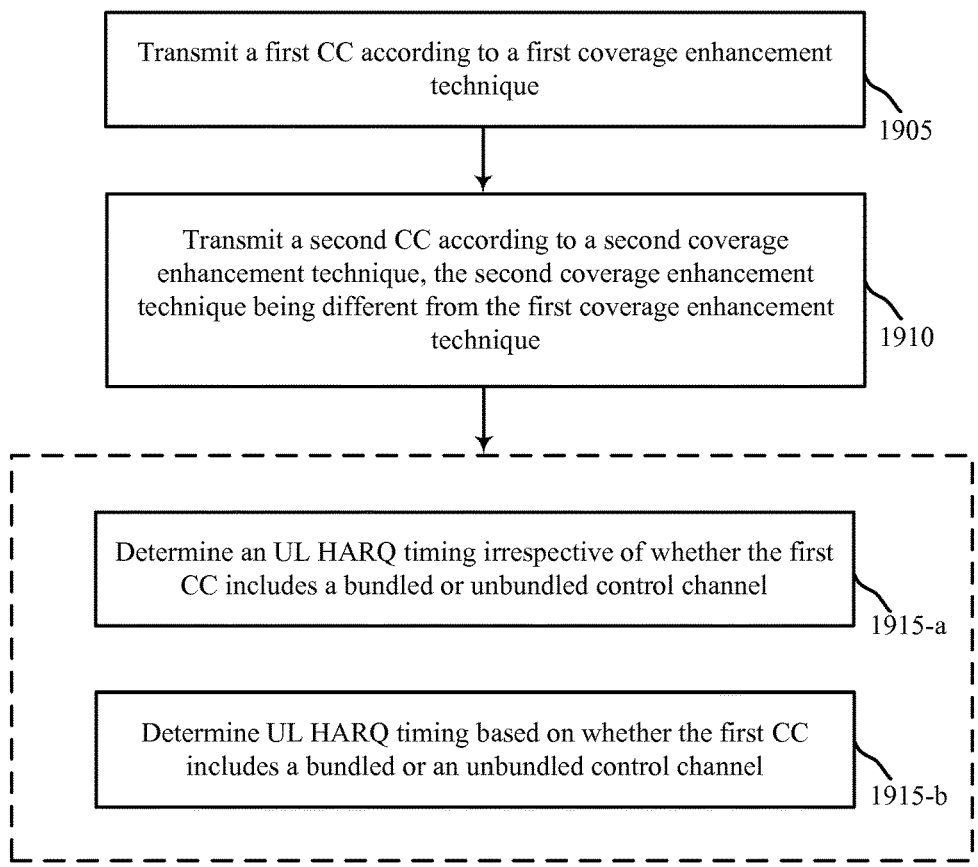
FIG. 19 is a flowchart of a method for effective deployment of coverage enhancement techniques, according to various embodiments.

In FIG. 19, a flowchart of a method 1900 for effective deployment of coverage enhancement techniques, according to various embodiments, is shown. The method 1700 may be an example of the methods 1500, 1600, 1700, and/or 1800, and it may be implemented by one or more of the UEs 115 and/or the base stations 105 of the preceding figures. Additionally or alternatively, the operations of the method 1900 may be performed by the receiver modules 510, the controller modules 515, and/or the transmitter modules 520 described with reference to FIGS. 5A, 5B, and 5C.

At block 1905, the method may include transmitting a first CC according to a first coverage enhancement technique. Additionally, at block 1910, the method may involve transmitting a second CC according to a second coverage enhancement technique, the second coverage enhancement technique being different from the first coverage enhancement technique. In various embodiments, the method may include determining an UL HARQ timing irrespective of whether the first CC includes a bundled or unbundled control channel, as shown at block 1915-*a*. Or, the method may include determining UL HARQ timing based on whether the first CC includes a bundled or unbundled control channel, as shown in block 1915-*b*.

Figure 20:
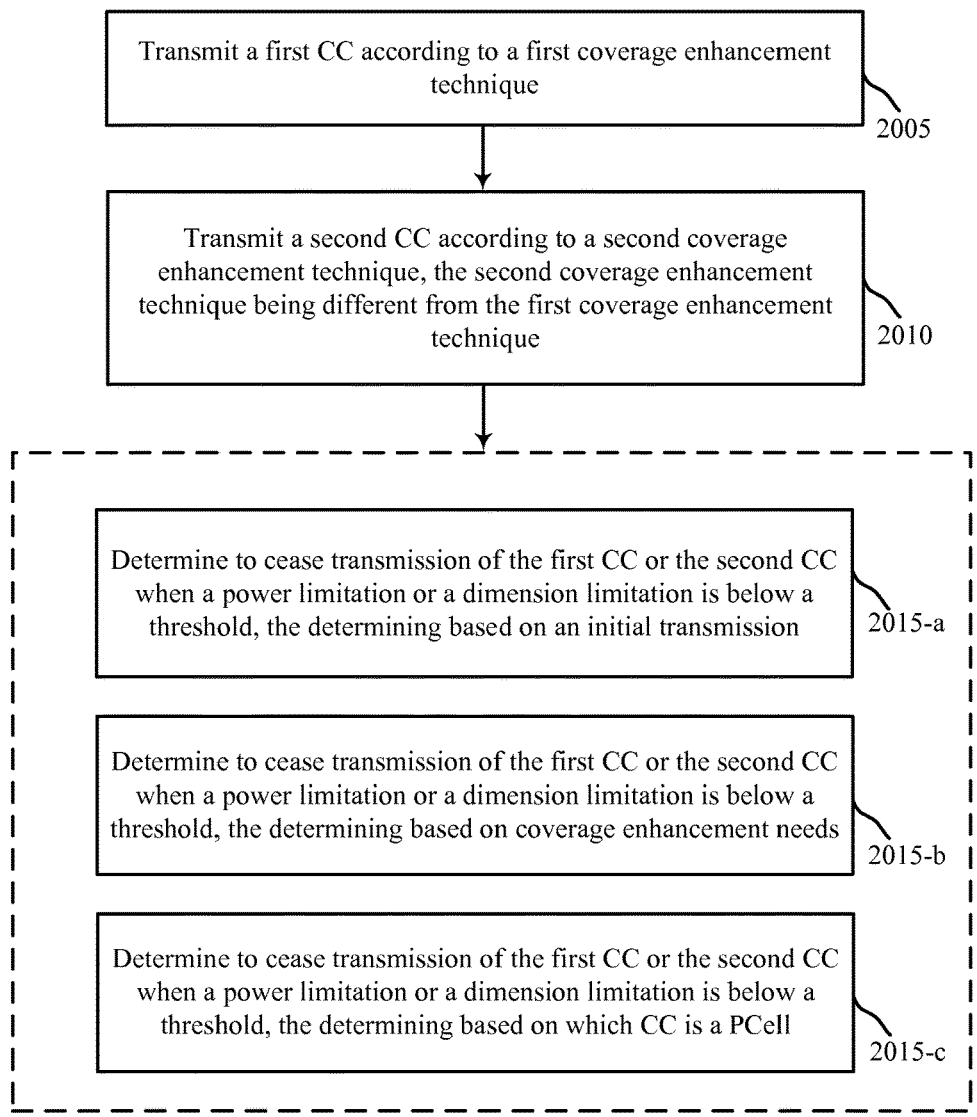
FIG. 20 is a flowchart of a method for effective deployment of coverage enhancement techniques, according to various embodiments.

In FIG. 20, a flowchart of a method 2000 for effective deployment of coverage enhancement techniques, according to various embodiments, is shown. The method 2000 may be an example of the methods 1500, 1600, 1700, 1800, and/or 1900, and it may be implemented by one or more of the UEs 115 and/or the base stations 105 of the preceding figures. Additionally or alternatively, the operations of the method 2000 may be performed by the receiver modules 510, the controller modules 515, and/or the transmitter modules 520 described with reference to FIGS. 5A, 5B, and 5C.

At block 2005, the method may include transmitting a first CC according to a first coverage enhancement technique. Additionally, at block 2010, the method may involve transmitting a second CC according to a second coverage enhancement technique, the second coverage enhancement technique being different from the first coverage enhancement technique. In various embodiments, the method may include determining to cease transmission of the first CC or the second CC when a power limitation or a dimension limitation is below a threshold. As shown at block 1915-*a*, the determining may be based on initial transmission. Or, as shown at block 1915-*b*, the determining may be based on coverage enhancement needs. Or, as shown at block 1915-*c*, the determining may be based on which CC is a PCell.

Those skilled in the art will recognize that the methods 800, 900, 1000, 1100, 1200, 1300, 1400, 1500, 1600, 1700, 1800, 1900, and 2000 are example implementations of the tools and techniques described herein. The methods may be performed with more or fewer steps; and they may be performed in an order other than indicated The detailed description set forth above in connection with the appended drawings describes example embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication at a user equipment (UE), comprising:
   receiving a first component carrier transmitted according to a first coverage enhancement technique;
   receiving a second component carrier transmitted according to a second coverage enhancement technique, wherein at least one of the first or the second coverage enhancement technique comprises bundling and the second coverage enhancement technique is different from the first coverage enhancement technique, wherein one or more uplink control channels and one or more downlink control channels are allocated to a component carrier having the least bundling;
   partitioning a soft buffer for the first and second component carriers, wherein the first component carrier is configured with a set number of hybrid automatic repeat request (HARQ) processes that is set based at least in part on the first coverage enhancement technique and the second component carrier is restricted to a same number of HARQ processes as the set number of HARQ processes;
   measuring path loss of the first component carrier and the second component carrier; and
   selecting, for initial access, the first component carrier or the second component carrier based at least in part on the measured path loss.

2. The method of claim 1, wherein the first coverage enhancement technique and the second coverage enhancement technique each comprise bundling, and wherein a difference between the first coverage enhancement technique and the second coverage enhancement technique comprises a difference in bundling size that is based at least in part on the number of consecutive transmission time intervals (TTIs) transmitted in a bundled transmission.

3. The method of claim 1, further comprising:
   measuring path loss of the first component carrier and the second component carrier; and transmitting feedback based on the measured path loss, the feedback comprising a suggested primary cell (PCell).

4. The method of claim 1, further comprising:
partitioning the soft buffer equally for the first and second component carriers, wherein a bundling length is different for each of the first and second component carriers.

5. The method of claim 1, further comprising:
partitioning the soft buffer based on a bundling length for each of the first and second component carriers, wherein the bundling length is different for each of the first and second component carriers.

6. The method of claim 1, wherein the first component carrier and the second component carrier belong to a subset of a plurality of component carriers received at the UE, and wherein each component carrier of the subset needs coverage enhancement and is restricted to a same number of HARQ processes.

7. The method of claim 1, further comprising:
receiving a third component carrier transmitted without coverage enhancement, wherein the third component carrier is configured with an unrestricted number of HARQ processes.

8. The method of claim 1, further comprising:
determining which component carrier has the least bundling, wherein:
the first coverage enhancement technique and the second coverage enhancement technique each comprise bundling; and
all control channels are allocated to the component carrier having the least bundling.

9. The method of claim 1, further comprising:
identifying a downlink (DL) HARQ timing based on whether the first component carrier comprises a bundled or an unbundled control channel.

10. The method of claim 1, wherein:
at least one of the first coverage enhancement technique or the second coverage enhancement technique comprises channel repetition; and
a length of the channel repetition is interpreted by the UE based on a category of the UE.

11. The method of claim 10, wherein at least one of the first component carrier or the second component carrier comprises a broadcast channel.

12. An apparatus for wireless communication, comprising:
a processor;
memory in electronic communication with the processor; and
instructions stored in the memory, the instructions executable by the processor to cause the apparatus to:
receive a second component carrier transmitted according to a second coverage enhancement technique, wherein at least one of the first or the second coverage enhancement technique comprises bundling and the second coverage enhancement technique is different from the first coverage enhancement technique, wherein one or more uplink control channels and one or more downlink control channels are allocated to a component carrier having the least bundling; and
partitioning a soft buffer for the first and the second component carriers, wherein the first component carrier is configured with a set number of hybrid automatic repeat request (HARQ) processes that is set based at least in part on the first coverage enhancement technique and the second component carrier is restricted to a same number of HARQ processes as the set number of HARQ processes;
measure path loss of the first component carrier and the second component carrier; and
select, for initial access, the first component carrier or the second component carrier based at least in part on the measured path loss.

13. The apparatus of claim 12, wherein the first coverage enhancement technique and the second coverage enhancement technique each comprise bundling, and wherein a difference between the first coverage enhancement technique and the second coverage enhancement technique comprises a difference in bundling size that is based at least in part on the number of consecutive transmission time intervals (TTIs) transmitted in a bundled transmission.

14. The apparatus of claim 12, wherein the instructions are executable by the processor to cause the apparatus to:
measure path loss of the first component carrier and the second component carrier; and
transmit feedback based on the measured path loss, the feedback comprising a suggested primary cell (PCell).

15. The apparatus of claim 12, wherein the instructions are executable by the processor to cause the apparatus to:
partition the soft buffer equally for the first and second component carriers, wherein a bundling length is different for each of the first and second component carriers.

16. The apparatus of claim 12, wherein the instructions are executable by the processor to cause the apparatus to:
partition the soft buffer based on a bundling length for each of the first and second component carriers, wherein the bundling length is different for each of the first and second component carriers.

17. The apparatus of claim 12, wherein the instructions are executable by the processor to cause the apparatus to:
receive a third component carrier transmitted without coverage enhancement, wherein the third component carrier is configured with an unrestricted number of HARQ processes.

18. The apparatus of claim 12, wherein the first component carrier and the second component carrier belong to a subset of a plurality of component carriers received at a user equipment (UE), and wherein each component carrier of the subset needs coverage enhancement and is restricted to a same number of HARQ processes.

19. The apparatus of claim 12, wherein the instructions are executable by the processor to cause the apparatus to:
determine which component carrier has the least bundling, wherein:
the first coverage enhancement technique and the second coverage enhancement technique each comprise bundling; and
all control channels are allocated to the component carrier having the least bundling.

20. The apparatus of claim 12, wherein the instructions are executable by the processor to cause the apparatus to:
identify a downlink (DL) HARQ timing based on whether the first component carrier comprises a bundled or an unbundled control channel.

21. The apparatus of claim 12, wherein:
at least one of the first coverage enhancement technique or the second coverage enhancement technique comprises channel repetition; and
a length of the channel repetition is interpreted by a user equipment (UE) based on a category of the UE.

22. The apparatus of claim 21, wherein at least one of the first component carrier or the second component carrier comprises a broadcast channel.

\* \* \* \* \*